US009853796B2

(12) United States Patent
Nishio

(10) Patent No.: US 9,853,796 B2
(45) Date of Patent: *Dec. 26, 2017

(54) TERMINAL APPARATUS AND METHOD FOR CONTROLLING CHANNEL QUALITY INDICATOR TRANSMISSION

(71) Applicant: Godo Kaisha IP Bridge 1, Tokyo (JP)

(72) Inventor: Akihiko Nishio, Osaka (JP)

(73) Assignee: Godo Kaisha IP Bridge 1, Tokyo (JP)

( * ) Notice: Subject to any disclaimer, the term of this patent is extended or adjusted under 35 U.S.C. 154(b) by 174 days.

This patent is subject to a terminal disclaimer.

(21) Appl. No.: 14/798,287

(22) Filed: Jul. 13, 2015

(65) Prior Publication Data

US 2015/0318971 A1 Nov. 5, 2015

Related U.S. Application Data

(63) Continuation of application No. 14/152,733, filed on Jan. 10, 2014, now Pat. No. 9,137,000, which is a (Continued)

(30) Foreign Application Priority Data

Aug. 20, 2003 (JP) .................................. 2003-295971

(51) Int. Cl.
*H04W 4/00* (2009.01)
*H04L 5/00* (2006.01)
(Continued)

(52) U.S. Cl.
CPC .......... *H04L 5/0057* (2013.01); *H04L 1/0003* (2013.01); *H04L 5/006* (2013.01);
(Continued)

(58) Field of Classification Search
CPC .............................................. H04W 72/0453
(Continued)

(56) References Cited

U.S. PATENT DOCUMENTS

| 6,049,561 A | 4/2000 | Pezzlo et al. |
| 6,603,734 B1 | 8/2003 | Oksanen |

(Continued)

FOREIGN PATENT DOCUMENTS

| JP | 2000102065 A | 4/2000 |
| JP | 2001036499 A | 2/2001 |

(Continued)

OTHER PUBLICATIONS

Classon et al., "Multi-dimensional Adaptation and Multi-user Scheduling Techniques for Wireless OFDM Systems," IEEE International Conference on Communications, 2003. ICC '03., vol. 3, May 15, 2003, pp. 2251-2255.

(Continued)

*Primary Examiner* — Farah Faroul
(74) *Attorney, Agent, or Firm* — Seed Intellectual Property Law Group LLP

(57) ABSTRACT

A terminal apparatus and an associated communication method to be implemented by the terminal apparatus are provided. The terminal apparatus includes a receiver which, in operation, receives, from a base station apparatus, control information indicating whether the terminal apparatus is to transmit one channel quality indicator (CQI) for each subcarrier block within a communication frequency band or one CQI for all subcarrier blocks within the communication frequency band instead of multiple CQIs for multiple subcarrier blocks within the communication frequency band. The terminal apparatus further includes a transmitter which, in operation, transmits one CQI for each subcarrier block within the communication frequency band or one CQI for all subcarrier blocks within the communication frequency band to the base station apparatus according to the received control information.

20 Claims, 20 Drawing Sheets

Related U.S. Application Data continuation of application No. 10/568,672, filed as application No. PCT/JP2004/012309 on Aug. 20, 2004, now Pat. No. 8,660,567.

(51) Int. Cl.
*H04W 72/04* (2009.01)
*H04L 1/00* (2006.01)
*H04W 88/08* (2009.01)
*H04L 25/02* (2006.01)

(52) U.S. Cl.
CPC .......... *H04L 5/0007* (2013.01); *H04L 5/0046* (2013.01); *H04W 72/0453* (2013.01); *H04L 5/0016* (2013.01); *H04L 25/0228* (2013.01); *H04W 88/08* (2013.01); *Y02B 60/50* (2013.01)

(58) Field of Classification Search
USPC ......................................................... 370/329
See application file for complete search history.

(56) References Cited

U.S. PATENT DOCUMENTS

| | | | |
|---|---|---|---|
| 6,885,697 | B1 | 4/2005 | Tokunaga et al. |
| 6,907,026 | B2 | 6/2005 | Akiyama |
| 6,937,557 | B1 | 8/2005 | Sudo |
| 7,106,689 | B1 | 9/2006 | Sudo |
| 7,126,996 | B2 * | 10/2006 | Classon ................ H04L 1/0026 370/332 |
| 7,512,409 | B1 | 3/2009 | Hadad |
| 2001/0024427 | A1 | 9/2001 | Suzuki |
| 2001/0033560 | A1 * | 10/2001 | Tong ..................... H04B 7/2656 370/337 |
| 2001/0055296 | A1 | 12/2001 | Akiyama |
| 2002/0111163 | A1 | 8/2002 | Hamabe |
| 2002/0147017 | A1 | 10/2002 | Li et al. |
| 2003/0012128 | A1 | 1/2003 | Miyoshi et al. |
| 2003/0096579 | A1 | 5/2003 | Ito et al. |
| 2003/0128658 | A1 | 7/2003 | Walton et al. |
| 2004/0087329 | A1 | 5/2004 | Shinoi |
| 2005/0025039 | A1 * | 2/2005 | Hwang ................... H04L 5/023 370/206 |
| 2005/0064832 | A1 * | 3/2005 | Kogawa ............... H04B 7/0802 455/168.1 |
| 2005/0289256 | A1 | 12/2005 | Cudak et al. |
| 2006/0153061 | A1 * | 7/2006 | Nishio .................. H04L 5/0046 370/208 |
| 2006/0160498 | A1 | 7/2006 | Sudo |
| 2006/0234754 | A1 | 10/2006 | Takano et al. |

FOREIGN PATENT DOCUMENTS

| | | | |
|---|---|---|---|
| JP | 2001144722 | A | 5/2001 |
| JP | 2001238269 | A | 8/2001 |
| JP | 2002009733 | A | 1/2002 |
| JP | 2002247626 | A | 8/2002 |
| JP | 2002252619 | A | 9/2002 |
| JP | 2003158500 | A | 5/2003 |
| JP | 2003198443 | A | 7/2003 |
| JP | 2003198651 | A | 7/2003 |
| JP | 2003218823 | A | 7/2003 |
| JP | 2003229829 | A | 8/2003 |
| RU | 2192094 | C1 | 10/2002 |
| WO | 01/17148 | A1 | 3/2001 |
| WO | 01/52441 | A2 | 7/2001 |
| WO | 02/049306 | A2 | 6/2002 |
| WO | 03/001761 | A1 | 1/2003 |

OTHER PUBLICATIONS

Decision of Dismissal of Written Amendment dated Jul. 6, 2010.
Ergen et al., "QoS Aware Adaptive Resource Allocation Techniques for Fair Scheduling in OFDMA Based Broadband Wireless Access Systems," IEEE Transactions on Broadcasting 49(4): 362-370, 2003.
Hara et al., "Frame Configuration and Control Scheme in MC-CDM Systems with Frequency Scheduling," Technical Report of IEICE, vol. 102, No. 203, Jul. 12, 2002, pp. 67-72.
Hara et al., "MC-CDM System for Packet Communications Using Frequency Scheduling," Technical Report of IEICE, vol. 102, No. 206, Jul. 12, 2002, pp. 61-66.
Indian Office Action dated May 26, 2014, for corresponding IN Patent Application No. 2269/MUMNP/2008, 2 pages.
International Search Report dated Nov. 30, 2004, for corresponding International Application No. PCT/JP2004/012309, 4 pages.
Japanese Office Action, dated Aug. 11, 2009.
Japanese Office Action, dated Dec. 8, 2009.
Japanese Office Action, dated Mar. 2, 2010.
Japanese Office Action, dated Aug. 16, 2011.
Japanese Office Action, dated Dec. 13, 2011, for corresponding Japanese Application No. 2010-156824, 3 pages.
Piazza et al., "Multiuser Diversity-Mobility Tradeoff: Modeling and Performance Analysis of a Proprotional Fair Scheduling," Global Telecommunications Conference, 2002. GLOBECOM '02. vol. 1, Nov. 21, 2002, pp. 906-910.
Russian Office Action, dated Apr. 22, 2011.
Supplementary European Search Report, dated Dec. 3, 2012, for corresponding European Application No. 04772265.7, 4 pages.
Ura et al., "Segment Allocation Alrgorithm for Multimedia MC-CDMA," IEICE Technical Report 100(664):105-110, Mar. 2, 2001.
Wong, et al., "Multiuser OFDM with Adaptive Subcarrier, Bit, and Power Allocation," IEEE Journal on Selected Areas in Communications, vol. 17(10):1747-1758, Oct. 1999.

* cited by examiner

TERMINAL APPARATUS AND METHOD FOR CONTROLLING CHANNEL QUALITY INDICATOR TRANSMISSION

BACKGROUND

Technical Field

The present invention relates to a wireless communication apparatus and subcarrier allocation method, and particularly to a wireless communication apparatus and subcarrier allocation method where data is allocated to a plurality of subcarriers using, for example, OFDM.

Description of the Related Art

In the related art, multi-carrier transmission such as OFDM and MC-CDMA, etc., has been examined as a beyond 3 G system taken as a system fulfilling high-speed packet transmission requirements. It is possible to improve frequency utilization efficiency in multi-carrier transmission by carrying out adaptive modulation and scheduling every subcarrier and by allocating data transmitted to each mobile station to subcarriers of superior reception quality within the communication band width using frequency scheduling. At base station apparatus, in order to carry out frequency scheduling by allocating data to be transmitted to each mobile station to subcarriers of superior reception quality, the mobile station notifies the base station apparatus of a CQI (Channel Quality Indicator) constituting individual channel quality information for every subcarrier for all subcarriers. The base station apparatus then determines the subcarrier, modulation scheme and coding rate to be used at each mobile station in accordance with a predetermined scheduling algorithm taking into consideration the CQI. Technology is disclosed, for example, in Japanese Patent Laid-open Publication No. 2002-252619 where frequency scheduling is carried out using all of the subcarrier CQI's from all of the users in the event that a base station transmits to a plurality of mobile stations at the same time.

Specifically, based on the CQI, the base station apparatus allocates a large number of subcarriers to each user in an appropriate manner (frequency division multiplexing) and selects an MCS (Modulation and Coding Scheme) for each subcarrier. Namely, based on channel quality, the base station apparatus satisfies the desired communication quality (for example, lowest transmission rate, lowest error rate) for each user, allocates subcarriers so as to achieve the maximum frequency utilization efficiency, and selects high-speed MCS for each subcarrier. This enables the implementation of a high throughput for a large number of users.

An MCS selection table decided in advance is used in the selection of MCS. The MCS selection table shows the correspondence between reception quality such as CIR (Carrier to Interference Ratio), etc., and error rates such as PER (Packet Error rate) or BER (Bit Error Rate), etc., for every MCS. During MCS selection, an MCS capable of satisfying the desired error rate is selected based on the measured reception quality.

FIG. 1 is a view showing the relationship between frequency and time in the case of allocating each item of data to a subcarrier block at the base station apparatus. From FIG. 1, the base station apparatus allocates all data to subcarrier blocks #10 to #14 using scheduling.

However, in the case of carrying out scheduling and adaptive modulation for every subcarrier block, it is necessary for communication terminal apparatus to report the CQI of every subcarrier to the base station apparatus. This means that the amount of control information sent from communication terminal apparatus to the base station apparatus is enormous and the transmission rate therefore falls. Further, it is also necessary for communication terminal apparatus to carry out processing to measure reception quality and generate the CQI, and for the base station apparatus to carry out processing for scheduling and adaptive modulation and suchlike for every subcarrier using the received CQI's. This means that the amount of signal processing occurring at the base station apparatus and communication terminal apparatus is extremely large, which makes it difficult to achieve lower power consumption and high signal processing speed.

BRIEF SUMMARY

According to an aspect of the present invention, wireless communication apparatus and a subcarrier allocation method are provided, which are capable of improving transmission efficiency, achieving low power consumption, and achieving high-speed signal processing by selecting data for scheduling according to data type.

According to an aspect of the present invention, wireless communication apparatus is comprised of a subcarrier allocation section allocating first data satisfying predetermined conditions to subcarriers selected by scheduling based on reception quality information indicating reception quality of each communicating party and required transmission rate information indicating required transmission rate of each communicating party and allocating second data different to the first data to preassigned subcarriers, and a transmission section transmitting the first data and the second data allocated to subcarriers by the subcarrier allocation section.

According to a further aspect of the present invention, a base station apparatus is provided with the wireless communication apparatus of the present invention.

According to a still further aspect of the present invention, a subcarrier allocation method comprises the steps of allocating first data satisfying predetermined conditions to subcarriers selected by scheduling based on reception quality information indicating reception quality of each communicating party and required transmission rate information indicating required transmission rate of each communicating party, and allocating second data different to the first data to preassigned subcarriers.

DETAILED DESCRIPTION

The following is a detailed description with reference to the drawings of preferred embodiments of the present invention.

First Embodiment

Figure 1:
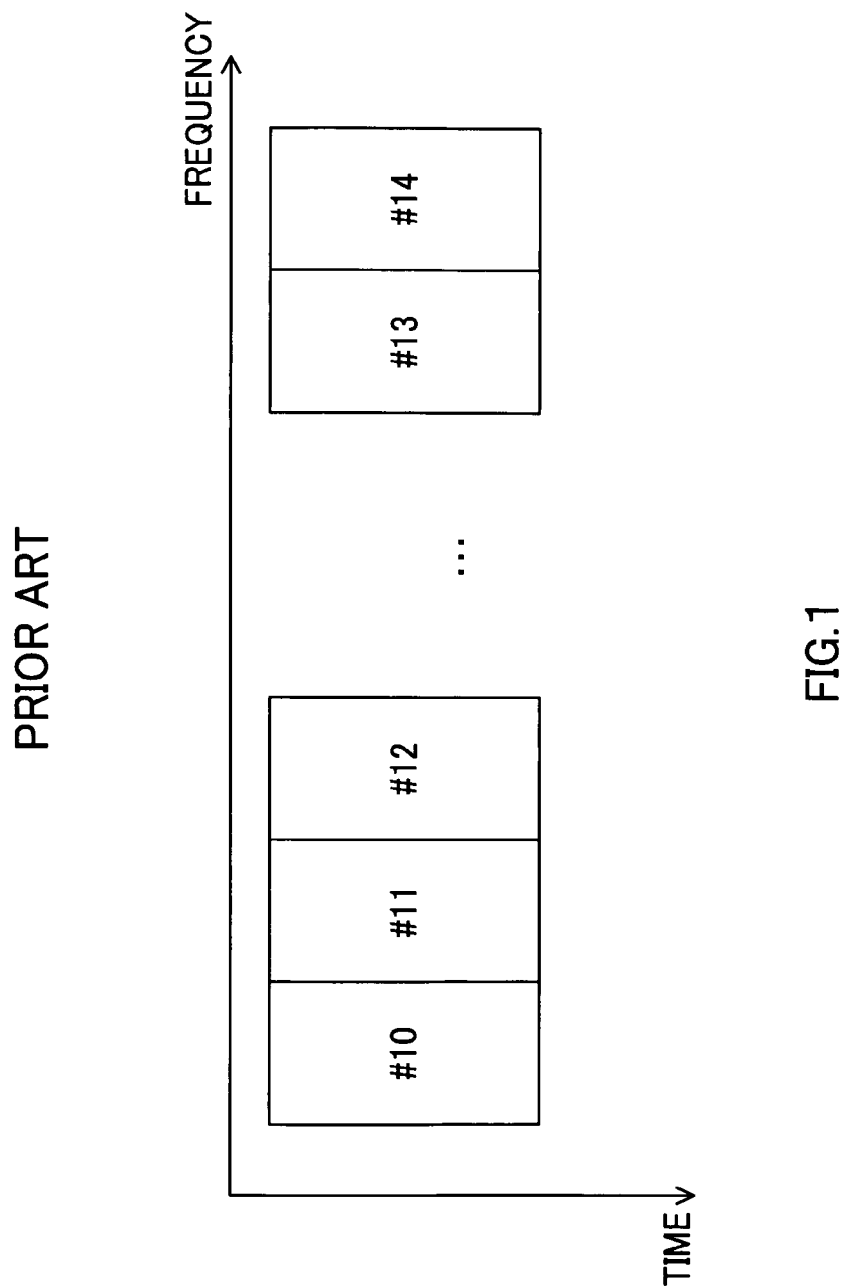
FIG. 1 is a view showing allocation of data to subcarriers of the related art.
Figure 2:
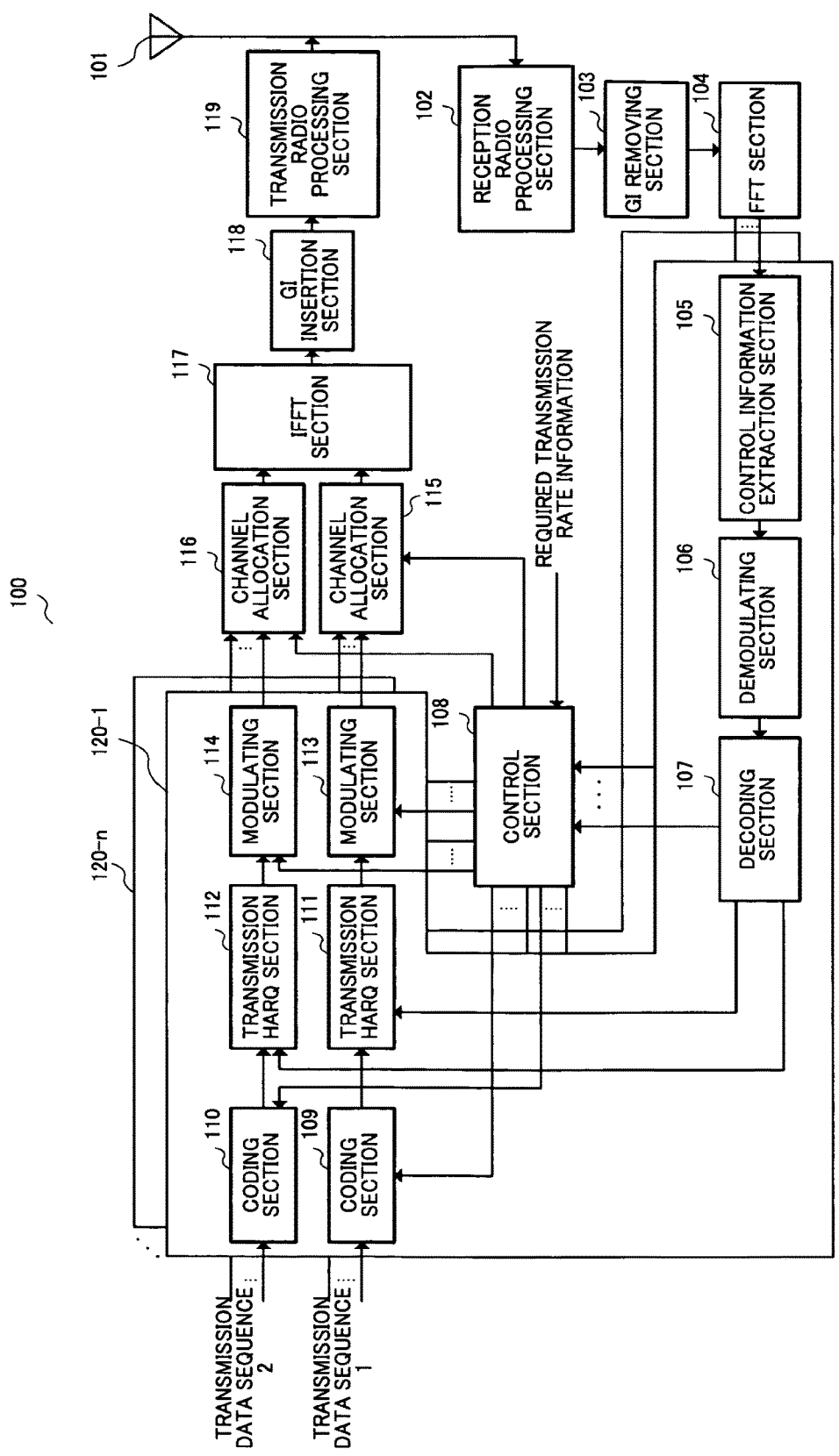
FIG. 2 is a block view showing a configuration for a wireless communication apparatus of a first embodiment of the present invention.

FIG. 2 is a block diagram showing a configuration for a wireless communication apparatus 100 of a first embodiment of the present invention.

Transmission data processing sections 120-1 to 120-n are each comprised of control information extraction section 105, demodulating section 106, decoding section 107, coding section 109, coding section 110, transmission HARQ (Hybrid Automatic Repeat Request) section 111, transmission HARQ section 112, modulating section 113 and modulating section 114. Transmission data processing sections 120-1 to 120-n are provided for the number of users and each of transmission data processing sections 120-1 to 120-n carries out processing on transmission data transmitted to one user.

A reception radio processing section 102 down converts a signal received at an antenna 101 from a radio frequency to a baseband frequency to output to a guard interval (hereinafter referred to as "GI") removing section 103.

The GI removing section 103 removes a GI from a received signal inputted from reception radio processing section 102 to output to a fast Fourier transform (hereinafter referred to as "FFT") section 104.

After a received signal inputted by GI removing section 103 is converted from serial data format to parallel data format, FFT section 104 carries out FFT processing and outputs the result to each control information extraction section 105 as a received signal for each user.

Control information extraction section 105 then extracts control information from the received signal inputted by FFT section 104 to output to demodulating section 106.

Demodulating section 106 subjects control information inputted by control information extraction section 105 to demodulation to output to a decoding section 107.

Decoding section 107 decodes the received signal inputted by demodulating section 106 and outputs CQI's for each subcarrier contained in the received data after demodulation to control section 108. Further, decoding section 107 decodes a received signal inputted by demodulating section 106, outputs a NACK signal or ACK signal for transmission data sequence 1 contained in the received data after decoding to transmission HARQ section 111 and outputs a NACK signal or ACK signal for transmission data sequence 2 contained in the received data after decoding to transmission HARQ section 112.

Control section 108 constituting subcarrier and MCS allocation means knows the number of useable subcarriers and the transmission rate required by each communication terminal apparatus and therefore, in accordance with the CQI's constituting reception quality information for the communication terminal apparatus of each user inputted by decoding section 107, selects subcarriers to which transmission data sequence 1 is allocated using frequency scheduling and selects preassigned subcarriers to which transmission data sequence 2 is allocated without carrying out frequency scheduling in such a manner that transmission rate required for each communication terminal apparatus is satisfied. Here, subcarriers transmission data sequence 1 is allocated to localized subcarriers around a specific frequency within the communication frequency band width and subcarriers transmission data sequence 2 is allocated to a plurality of subcarriers distributed over the whole of the communication frequency band width. Further, data for transmission data sequence 1 is, for example, dedicated data transmitted individually to the communication terminal apparatus of each user, and data for transmission data sequence 2 is, for example, common data (for example, broadcast data or multicast data) transmitted in common to the communication terminal apparatus for the plurality of users. Transmission data sequence 1 is not limited to dedicated data, and it is possible to use arbitrary data, from which effects of frequency scheduling and adaptive modulation can be obtained, such as high-speed data demanded of high-speed transfer or data transmitted to communication terminals during low speed movement and suchlike. The transmission data sequence 2 is also not limited to common data and arbitrary data such as data requiring continuous transmission at the same transmission rate such as data for which the required transmission speed is low or data transmitted to communication terminal apparatus during high-speed movement, or data for which effects of frequency scheduling are low and bit error rate can be improved using frequency diversity effects may be used.

Further, control section 108 appropriately selects MCS's for the M-ary number and coding rates, etc., using CQI's of the communication terminal apparatus of each user inputted by the decoding section 107 for the transmission data sequence 1 subjected to frequency scheduling. Namely, control section 108 holds a table storing MCS selection information correlating CQI and modulation schemes, and CQI and coding rate, and selects the modulation scheme and coding rate every subcarrier by referring to MCS selection information using CQI for every subcarrier sent from communication terminal apparatus of each user. Regarding the transmission data sequence 1, control section 108 outputs coding rate information selected for each subcarrier to which the transmission data sequence 1 is allocated to the coding section 109 and outputs modulation scheme information selected for each subcarrier to which the transmission data sequence 1 is allocated to modulating section 113.

Further, in the event that CQI's are not reported on by the communication terminal apparatus every subcarrier for the transmission data sequence 2 not subjected to frequency scheduling, control section 108 uses a predetermined coding rate and a predetermined modulation scheme using the required transmission rate, etc. Control section 108 outputs coding rate information constituting the predetermined coding rate to coding section 110 and modulation scheme information constituting the predetermined modulation scheme to modulating section 114. On the other hand, in the event that one item of CQI indicating an average reception quality of all subcarriers in a communication frequency band is inputted, control section 108 refers to the MCS selection information from the inputted CQI and selects a coding rate and modulation scheme, outputs the selected coding rate information to coding section 110 and outputs the selected modulation scheme information to modulating section 114.

Further, control section 108 outputs information for subcarriers the transmission data sequence 1 is allocated to by frequency scheduling to the channel allocation section 115 and allocates preassigned subcarriers for the transmission data sequence 2 that is not subjected to frequency scheduling and outputs subcarrier information to channel allocation section 116. Here, required transmission rate is, for example, information for the proportion of the amount of data per unit time required by a communication terminal apparatus of one user with respect to the amount of data per unit time required by all communication terminal apparatus. The method of allocating transmission data sequence 1 and transmission data sequence 2 to subcarriers is described in the following.

Coding section 109 codes inputted transmission data sequence 1 (first data) and outputs this to transmission HARQ section 111 based on coding rate information inputted by control section 108.

Coding section 110 codes inputted transmission data sequence 2 (second data) and outputs this to transmission HARQ section 112 based on coding rate information inputted by control section 108.

Transmission HARQ section 111 outputs transmission data sequence 1 inputted by coding section 109 to modulating section 113 and temporarily holds transmission data sequence 1 outputted to modulating section 113. In the event that a 'NACK signal is inputted by decoding section 107, transmission HARQ section 111 outputs temporarily stored transmission data sequence 1 for which output is complete to modulating section 113 again due to a retransmission request by a communication terminal apparatus. On the other hand, in the event that an ACK signal is inputted by decoding section 107, transmission HARQ section 111 outputs new transmission data to modulating section 113.

Transmission HARQ section 112 outputs transmission data sequence 2 inputted by coding section 110 to modulating section 114 and temporarily holds transmission data sequence 1 outputted to modulating section 114. In the event that a NACK signal is inputted by decoding section 107, transmission HARQ section 112 outputs temporarily stored transmission data sequence 2 for which output is complete to modulating section 114 again due to a retransmission request by a communication terminal apparatus. On the other hand, in the event that an ACK signal is inputted by decoding section 107, transmission HARQ section 112 outputs new transmission data to modulating section 114.

Modulating section 113 modulates transmission data sequence 1 inputted by transmission HARQ section 111 based on modulation scheme information inputted by control section 108 and outputs this to channel allocation section 115.

Modulating section 114 modulates transmission data sequence 2 inputted by transmission HARQ section 112 based on modulation scheme information inputted by control section 108 and outputs this to channel allocation section 116.

Channel allocation section 115 allocates transmission data sequence 1 inputted by modulating section 113 to subcarriers based on subcarrier information inputted by control section 108 and outputs this to Inverse Fast Fourier Transform (hereinafter abbreviated to "IFFT") section 117.

Channel allocation section 116 allocates transmission data sequence 2 inputted by modulating section 114 to subcarriers based on subcarrier information inputted by control section 108 and outputs this to IFFT section 117.

IFFT section 117 subjects transmission data sequence 1 inputted by channel allocation section 115 and transmission data sequence 2 inputted by channel allocation section 116 to inverse fast Fourier transformation, and outputs this to GI insertion section 118.

GI insertion section 118 inserts GI's into transmission data sequence 1 and transmission data sequence 2 inputted by IFFT section 117 and outputs this to transmission wireless processing section 119.

Transmission wireless processing section 119 upconverts, etc., transmission data sequence 1 and transmission data sequence 2 inputted from GI insertion section 118 from a baseband frequency to a radio frequency for transmission from antenna 101. Wireless communication apparatus 100 transmits control information to communication terminal apparatus by coding control data using a coding section (not shown) and modulating control information using a modulating section (not shown). Here, control information is constituted of modulation scheme information, coding rate information, and scheduling information constituted by allocated subcarrier information, etc. Further, control information can be transmitted prior to continuous data transmission or may be transmitted as one of the transmission data sequence 2 at the same time as data transmission.

Figure 3:
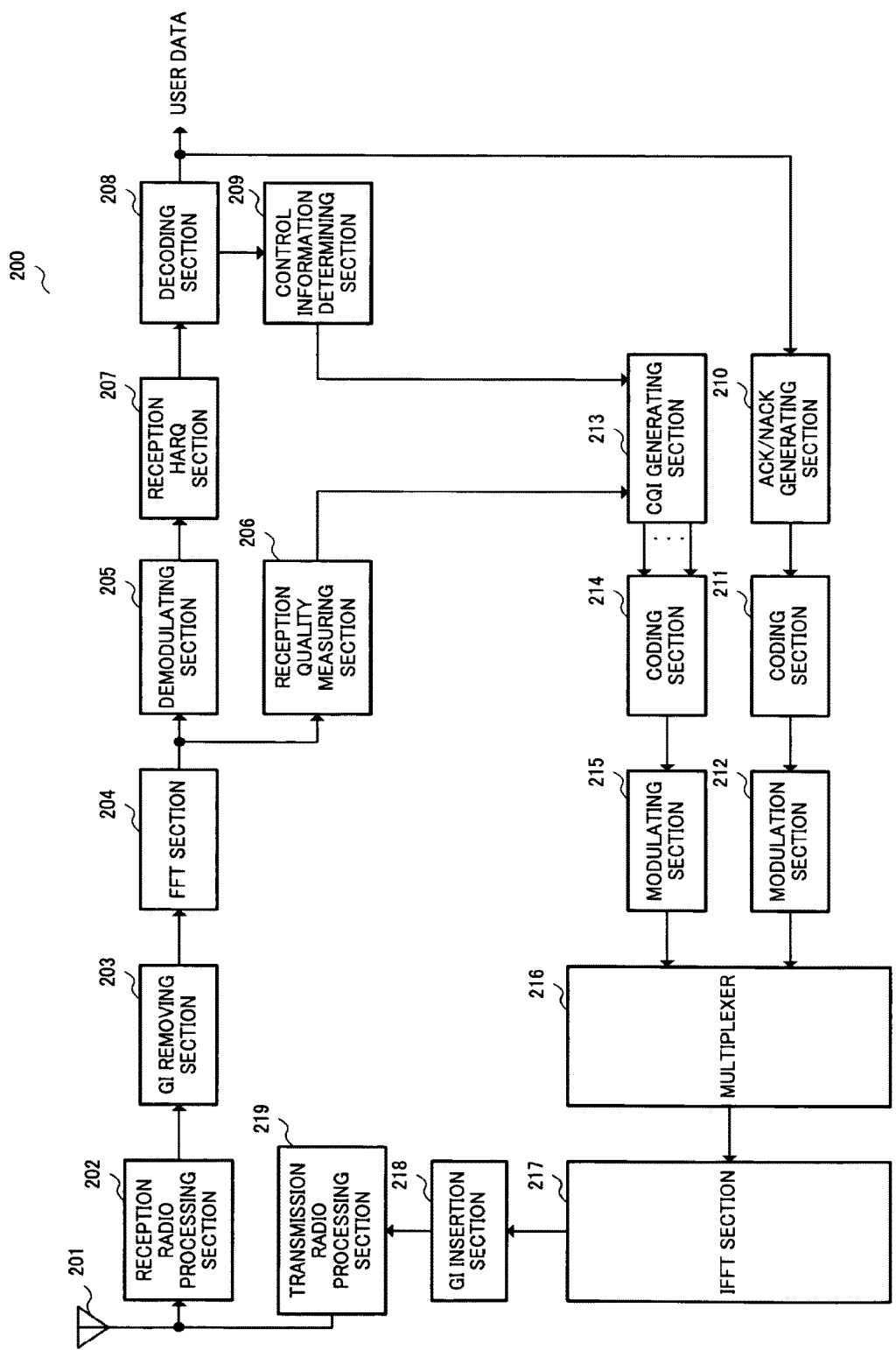
FIG. 3 is a block view showing a configuration for a communication terminal apparatus of the first embodiment of the present invention.

Next, a description is given of a configuration for communication terminal apparatus 200 using FIG. 3. FIG. 3 is a block diagram showing a configuration for communication terminal apparatus 200.

A reception radio processing section 202 down converts a signal received at an antenna 201 from a radio frequency to a base band frequency, etc., for output to a GI removal section 203.

GI removal section 203 removes GI from the received signal inputted by reception radio processing section 202 for output to an FFT section 204.

After a received signal inputted by GI removing section 203 is converted from a serial data format to a parallel data format, FFT section 204 despreads each item of data converted to parallel data format using a despreading code, subjects this to fast Fourier transform, and outputs this to demodulating section 205 and reception quality measuring section 206.

Demodulating section 205 demodulates the received signal inputted by FFT section 204 and outputs this to reception HARQ section 207.

Reception quality measuring section 206 measures reception quality using the received signal inputted by FFT section 204 and outputs measured reception quality information to CQI generating section 213. Namely, reception quality measuring section 206 obtains a measurement value indicating an arbitrary reception quality such as CIR (Carrier to Interference Ratio) or SIR (Signal to Interference Ratio), etc., and outputs the obtained measurement value to CQI generating section 213 as reception quality information.

If the received signal inputted by demodulating section 205 is new data, reception HARQ section 207 saves all or part of the received signal and outputs the received signal to decoding section 208. If the received signal is retransmitted data, the saving takes place after combining with a received signal saved previously and the combined received signal is outputted to decoding section 208.

Decoding section 208 decodes the received signal inputted by reception HARQ section 207 and outputs this as user data. Further, decoding section 208 performs error detection and decoding and outputs this to control information determining section 209 and ACK/NACK generating section 210. The error detection may use CRC (Cyclic Redundancy Checks). This error detection is not limited to CRC and arbitrary error detection methods may also be applied.

Control information determining section 209 extracts control information from the received signal inputted by decoding section 208 and determines whether or not user data for its own address has been subjected to frequency scheduling using the extracted control information. In the event that frequency scheduling has taken place, control information determining section 209 controls CQI generating section 213 in order to generate CQI for each subcarrier. In the event that frequency scheduling has not taken place, control information determining section 209 controls CQI generating section 213 so that CQI is not generated, or controls CQI generating section 213 in such a manner that one item of CQI indicating reception quality averaged for all of the subcarriers within the communication frequency band is generated. In this case, frequency scheduling not having taken place means that preassigned subcarriers have been allocated by wireless communication apparatus 100.

ACK/NACK generating section 210 generates a NACK signal constituting an error determination signal if retransmission is necessary using error detection results information inputted by decoding section 208, generates an ACK signal constituting an error determination signal in the event that retransmission is not necessary, and outputs the generated NACK signal and ACK signal to a coding section 211.

Coding section 211 codes a NACK signal or ACK signal inputted by ACK/NACK generating section 210 to output to modulating section 212.

Modulating section 212 modulates a NACK signal or ACK signal inputted by coding section 211 for output to multiplexer 216.

In the event that frequency scheduling has taken place, and in the case that CQI generating section 213 has been controlled so that CQI is generated by control information determining section 209, CQI generating section 213 compares reception quality information inputted by reception quality measuring section 206 and a plurality of CQI selection threshold values set according to reception quality, and selects and generates CQI for each subcarrier. Namely, CQI generating section 213 has a reference table saving information for CQI selection use to which different CQI's are assigned every predetermined region for measurement values indicating reception quality separated by the plurality of CQI selection threshold values and selects CQI's by referring to information for CQI selection use employing reception quality information inputted by a reception quality measuring section 206. CQI generating section 213 generates one CQI for one subcarrier. CQI generating section 213 outputs the generated CQI's to coding section 214. In the event that frequency scheduling has not taken place and in the case that CQI generating section 213 has been controlled so as to generate CQI indicating average reception quality for all of the subcarriers within a communication frequency band by control information determining section 209, CQI generating section 213 obtains average reception quality from reception quality information for each carrier inputted by reception quality measuring section 206 and outputs one item of CQI indicating the obtained average reception quality to coding section 214. On the other hand, in the event that frequency scheduling has not taken place, and in the case that CQI generating section 213 has been controlled so that CQI is not generated by control information determining section 209, CQI generating section 213 does not generate CQI.

Coding section 214 codes CQI inputted by CQI generating section 213 and outputs this to modulating section 215.

Modulating section 215 modulates CQI's inputted by coding section 214 for output to a multiplexer 216.

Multiplexer 216 multiplexes CQI inputted by modulating section 215 and NACK signals or ACK signals inputted by modulating section 212 and outputs generated transmission data to IFFT section 217. In the event that CQI is not inputted by modulating section 215, multiplexer 216 outputs just an ACK signal or NACK signal to IFFT section 217.

IFFT section 217 subjects transmission data inputted by multiplexer 216 to inverse fast Fourier transform and outputs this to GI insertion section 218.

GI insertion section 218 inserts GI's into transmission data inputted from IFFT section 217 for output to a transmission radio processing section 219.

Transmission radio processing section 219 upconverts, etc., transmission data inputted from GI insertion section 218 from a baseband frequency to a radio frequency for transmission to antenna 201.

A description is given for wireless communication apparatus 100 and communication terminal apparatus 200 where a subcarrier is taken as a unit of allocation but it is also possible to adopt subcarrier blocks or resource blocks where pluralities of subcarriers are collected together.

Figure 4:
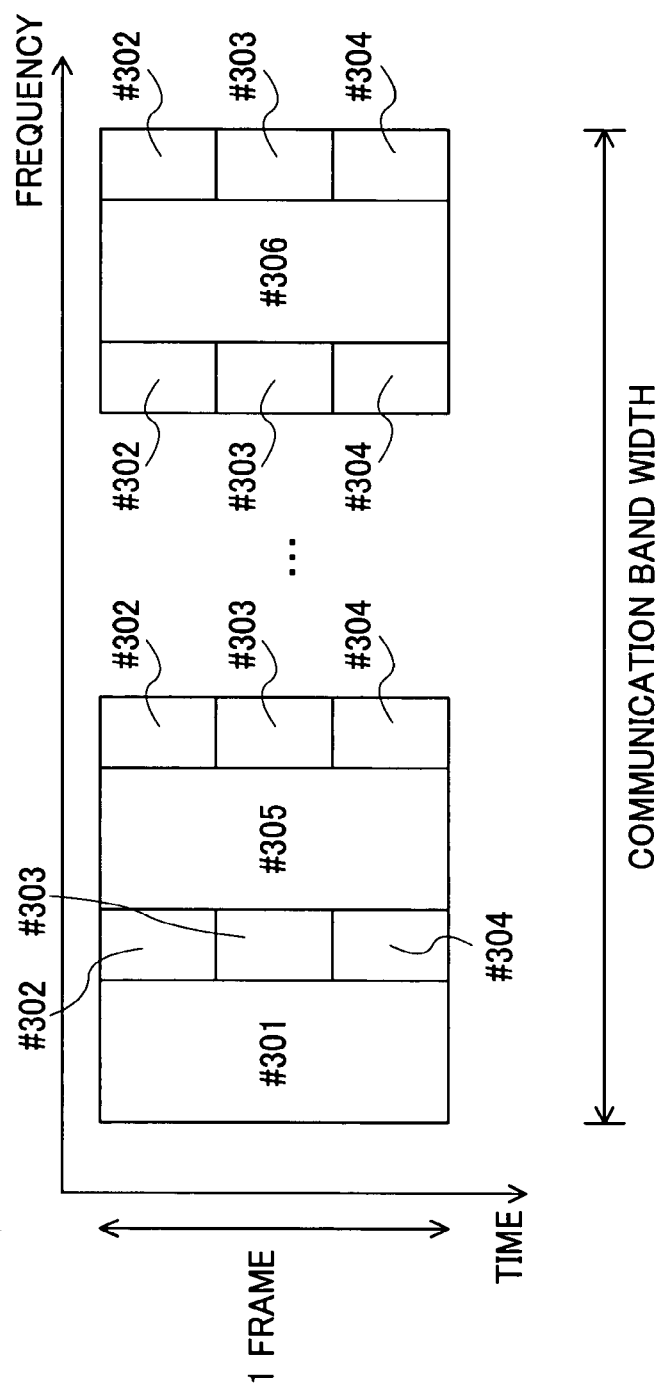
FIG. 4 is a view showing allocation of data to subcarriers of the first embodiment of the present invention.
Figure 5:
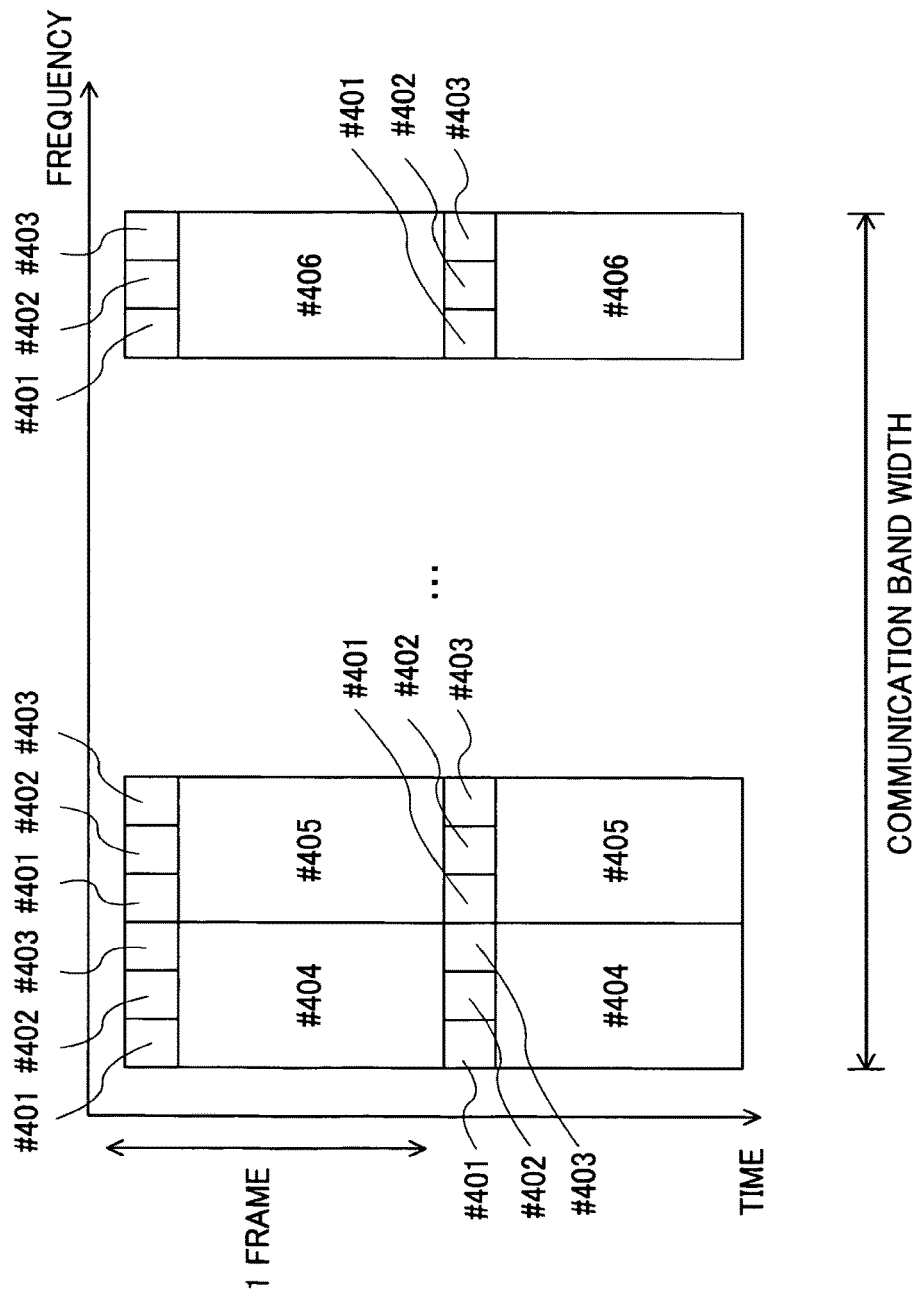
FIG. 5 is a further view showing allocation of data to subcarriers of the first embodiment of the present invention.

Next, a description is given using FIG. 4 and FIG. 5 of a method of allocating subcarriers at wireless communication apparatus 100. FIG. 4 is a view showing a relationship between frequency and time in the event that transmission data sequence 1 and transmission data sequence 2 are frequency-multiplexed every frame, and FIG. 5 is a view showing a relationship between frequency and time in the event that transmission data sequence 1 and transmission data sequence 2 are time-multiplexed every frame.

Here, when frequency scheduling and adaptive modulation is carried out every subcarrier, the amount of control information is huge, and the amount of signal processing taking place at wireless communication apparatus 100 and communication terminal apparatus 200 is enormous. Typically, subcarrier blocks are adopted where a plurality of consecutive subcarriers where correlation of fading fluctuation is high are collected together, with frequency scheduling and adaptive modulation then taking place in subcarrier block units.

First, a description is given of the case where transmission data sequence 1 and transmission data sequence 2 are frequency-multiplexed. From FIG. 4, at a predetermined communication frequency band, data of transmission data sequence 1 transmitted to communication terminal apparatus of user 1 is allocated to subcarrier block #301, data of transmission data sequence 1 to be transmitted to communication terminal apparatus of user 2 is allocated to subcarrier block #305, and data of transmission data sequence 1 to be transmitted to communication terminal apparatus of user n is allocated to subcarrier block #306. On the other hand, data for transmission data sequence 2 transmitted in common to communication terminal apparatuses of a plurality of users arbitrarily selected from users 1 to n is allocated to time-multiplexed channels #302, #303, #304, and channel #302, #303, #304 are allocated to subcarriers between subcarrier blocks #301, #305, #306. Channel #302, #303, #304 are allocated to a plurality of subcarriers distributed over the whole of the communication frequency band. As a result, frequency diversity effects are obtained for data for transmission data sequence 2. In this event, the frequency diversity effect is greater for a larger number of allocated subcarriers and a greater spread of subcarrier frequencies.

Next, a description is given of the case where transmission data sequence 1 and transmission data sequence 2 are time-multiplexed. In a first method of time-multiplexing transmission data sequence 1 and transmission data sequence 2, from FIG. 5, in a predetermined communication frequency band, data for transmission data sequence 1 to be transmitted to communication terminal apparatus of user 1 is allocated to subcarrier block #404, data for transmission data sequence 1 to be transmitted to communication terminal apparatus of user 2 is allocated to subcarrier block #405, and data for transmission data sequence 1 to be transmitted to communication terminal apparatus of user n is allocated to subcarrier block #406. On the other hand, data for transmission data sequence 2 transmitted in common to communication terminal apparatuses of a plurality of users arbitrarily selected from users 1 to n is allocated to frequency-multiplexed channels #401, #402, #403. Channels #401, #402, #403 are allocated to a plurality of subcarriers distributed over the whole of the communication frequency band. As a result, frequency diversity effects are obtained for data for transmission data sequence 2. In this event, the frequency diversity effect is greater for a larger number of allocated subcarriers and a greater spread of subcarrier frequencies.

Further, in a second method for time-multiplexing transmission data sequence 1 and transmission data sequence 2, channel configuration is set in time slot units. A time slot for transmitting transmission data sequence 1 that has been subjected to frequency scheduling and a time slot for transmitting transmission data sequence 2 that has not been subjected to frequency scheduling are decided in advance. The number of time slots allocated to the data of transmission data sequence 1 and the number of time slots allocated to data for transmission data sequence 2 is then changed according to the amount of traffic, properties of the transmission data sequence, and propagation path environment. For example, when it is demanded to reduce resources allocated to transmission data sequence 1 and to increase resources allocated to transmission data sequence 2 with the channel configuration shown in FIG. 4 and FIG. 5, the number of bits it is possible to transmit with one channel (for example, subcarrier block #301) for respective MCS's is reduced, and it is necessary to change the amount of data transmitted for upper layers such as control stations, etc. This means that the influence on other functions is substantial and complex control becomes necessary. However, as with the second method, if channel configuration is set in advance using time slot units, it is possible to simply change the number of time slots. The number of bits transmitted by one channel therefore does not change and it can be ensured that there is no influence on other functions with straightforward control.

Figure 6A:
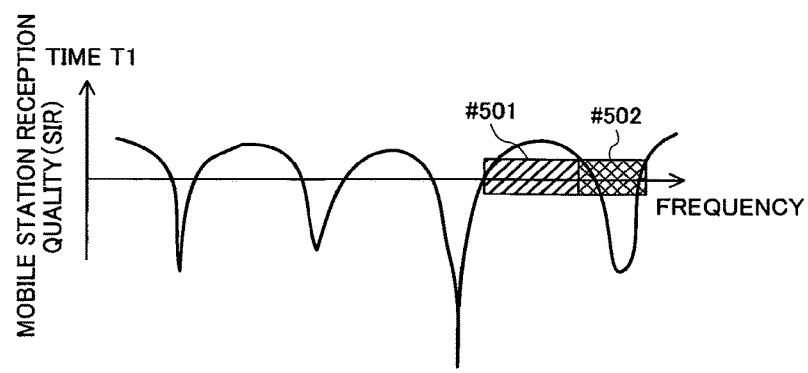
FIG. 6A is another view showing allocation of data to subcarriers of the first embodiment of the present invention.

Next, a description is given of a method for allocating transmission data sequence 1 and transmission data sequence 2 to each subcarrier, and the influence of fluctuation in SIR in the event of transmitting each of transmission data sequence 1 and transmission data sequence 2 allocated to subcarriers using FIG. 6A, FIG. 6B, FIG. 7A and FIG. 7B. The methods of allocating transmission data sequence 1 and transmission data sequence 2 to subcarriers can be considered to be the two methods of FIG. 6A, B and FIG. 7A, B. FIG. 6A, B show the case of allocating transmission data sequence 1 to subcarriers using frequency scheduling and allocating transmission data sequence 2 only to localized subcarriers of a specific frequency. Further, FIG. 7A, B show the case of allocating transmission data sequence 1 to subcarriers using frequency scheduling and allocating transmission data sequence 2 to a plurality of subcarriers distributed over the whole of the communication frequency band. In FIG. 6A, FIG. 6B, FIG. 7A and FIG. 7B, the vertical axis is received SIR, with fluctuations occurring in the frequency direction due to frequency-selective fading.

First, a description is given of the case in FIG. 6A, B where transmission data sequence 1 is allocated to subcarriers using scheduling and transmission data sequence 2 is only allocated to localized subcarriers around a specific frequency. As shown in FIG. 6A, at time T1, data #501 for transmission data sequence 1 is allocated only to subcarriers for part of the communication frequency band by scheduling, and data #502 for transmission data sequence 2 is allocated only to localized subcarriers around a specific frequency decided in advance.

Figure 6B:
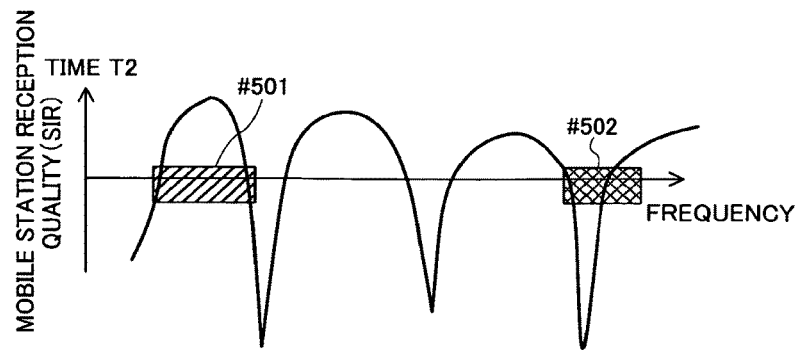
FIG. 6B is a view showing allocation of data to subcarriers of the first embodiment of the present invention.

As shown in FIG. 6B, at time T2, SIR for a frequency of subcarriers the data #502 of transmission data sequence 2 is allocated to falls down further than at time T1 due to fading fluctuation, and data #501 for transmission data sequence 1 is allocated to subcarriers of superior reception quality different from the subcarriers at a time T1 using scheduling. On the other hand, data #502 for transmission data sequence 2 is allocated to subcarriers determined in advance. Allocation to the same subcarrier therefore remains the case even if SIR drops. In this way, in the event that data #502 for transmission data sequence 2 is allocated only to localized subcarriers around a specific frequency, when the SIR drops for a long period of time, the effectiveness of error correction coding is also reduced, and the possibility that data #502 for transmission data sequence 2 will not be decoded without errors at communication terminal apparatus is high.

Figure 7A:
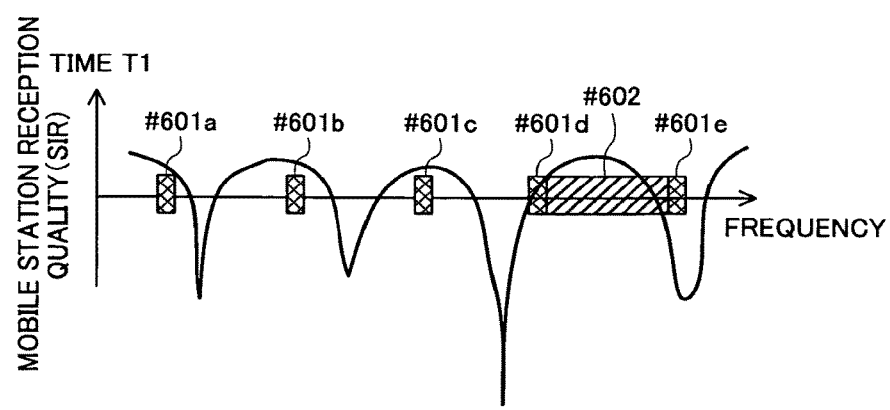
FIG. 7A is a further view showing allocation of data to subcarriers of the first embodiment of the present invention.

Next, a description is given of the case of FIG. 7A, B where transmission data sequence 1 is allocated to subcarriers using frequency scheduling and transmission data sequence 2 is allocated to a plurality of subcarriers distributed over the whole of the communication frequency band. As shown in FIG. 7A, at time T1, data #602 for transmission data sequence 1 is allocated only to subcarriers for part of the communication frequency band by scheduling, and data #601a to #601e of transmission data sequence 2 is allocated to a plurality of subcarriers distributed over the whole of the communication frequency band decided in advance. At time T1, the SIR for the frequency of the subcarriers data #601e is allocated to drops due to fading fluctuation but the SIR for the frequency of the subcarriers data #601a to #601d constituting the same data is allocated to does not drop. The communication terminal apparatus is therefore capable of receiving data #601a to #601e for transmission data sequence 2 without error using the results of error correction coding. Further, data #602 for transmission data sequence 1 is allocated to subcarriers of frequencies for which the SIR does not drop due to scheduling.

Figure 7B:
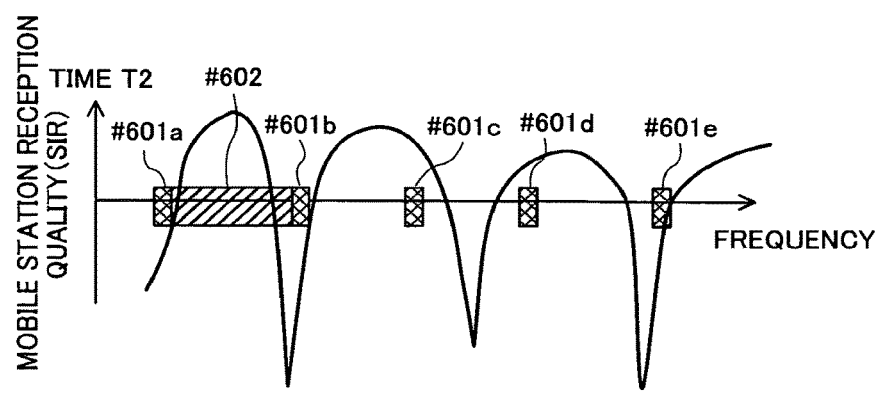
FIG. 7B is another view showing allocation of data to subcarriers of the first embodiment of the present invention.

As shown in FIG. 7B, at time T2, in the event that the propagation environment changes, the SIR of frequencies for subcarriers data #601e and data #601b are allocated to drops due to fading fluctuation but the SIR for frequencies the subcarriers data #601a, #601c, #601d constituting the same data are allocated to does not drop. Because of this, while signal receiving processing is carried out at communication terminal apparatus, it is possible to decode data for transmission data sequence 2 that also includes data for data #601e and data #601b without error using the results of error correction coding. Further, data #502 of transmission data sequence 1 is allocated to subcarriers of frequencies for which SIR does not drop different from subcarriers of frequencies to which allocated at time T1 using scheduling.

According to this first embodiment, transmission data sequence 1 is allocated to subcarriers using scheduling and transmission data sequence 2 is allocated to preassigned subcarriers. It is therefore not necessary for CQI to be sent from communication terminal apparatus transmitting transmission data sequence 2 every subcarrier. This means that transmission rate can be improved because the amount of control information can be reduced with respect to the amount of transmission data.

Further, according to this first embodiment, it is not necessary to generate CQI every subcarrier at communication terminal apparatus transmitting transmission data sequence 2 and it is not necessary to perform scheduling and subcarrier allocation for transmission data sequence 2 at base station apparatus. This means it is possible to achieve high-speed signal processing at the base station apparatus and the communication terminal apparatus.

Moreover, according to the first embodiment, frequency diversity effects are obtained by distributing a plurality of subcarriers over the whole of the communication frequency band and allocating transmission data sequence 2. It is therefore possible to improve error rate characteristics as a result of fading fluctuation, etc., not exerting any influence and the number of retransmissions can be reduced. It is therefore possible to improve overall throughput.

Further, in the event that the number of time slots for transmitting transmission data sequence 1 and the number of time slots for transmitting transmission data sequence 2 are changed according to the amount of traffic, etc., this can be achieved simply by increasing or reducing the number of time slots for transmitting each item of data and processing can therefore be simplified.

Second Embodiment

Figure 8:
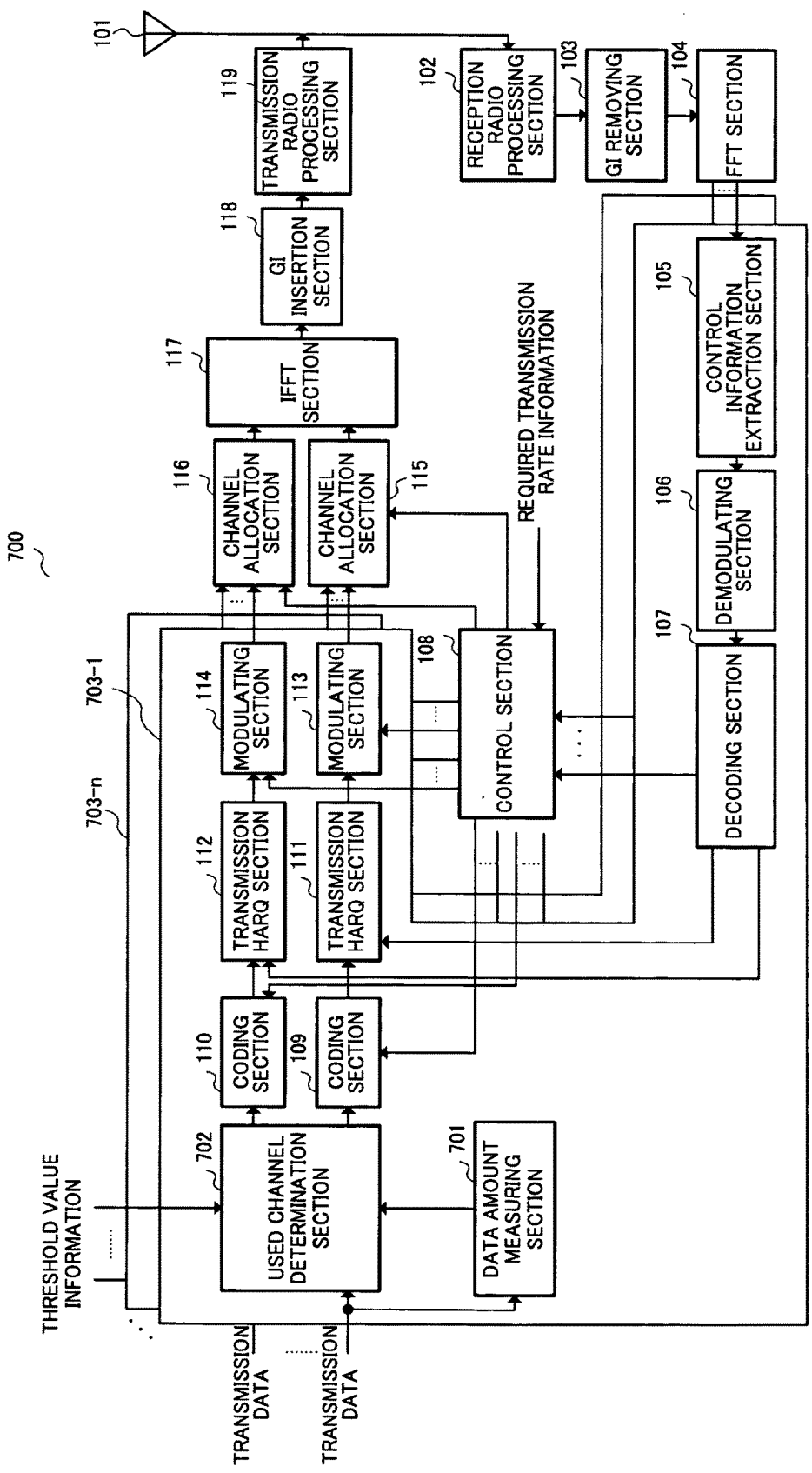
FIG. 8 is a block view showing a configuration for a wireless communication apparatus of a second embodiment of the present invention.

FIG. 8 is a block diagram showing a configuration for wireless communication apparatus 700 of a second embodiment of the present invention.

As shown in FIG. 8, wireless communication apparatus 700 of this second embodiment is wireless communication apparatus 100 of the first embodiment shown in FIG. 2 with data amount measuring section 701 and used channel determination section 702 added. In FIG. 8, portions with the same configuration as for FIG. 2 are given the same numerals and are not described.

Transmission data processing sections 703-1 to 703-n are each constituted by control information extraction section 105, demodulating section 106, decoding section 107, coding section 109, coding section 110, transmission HARQ (Hybrid Automatic Repeat Request) section 111, transmission HARQ section 112, modulating section 113, modulating section 114, data amount measuring section 701, and used channel determination section 702. Transmission data processing sections 703-1 to 703-n are provided for just the number of users and each of the transmission data processing sections 703-1 to 703-n carries out processing on transmission data transmitted to one user.

Data amount measuring section 701 measures the amount of data for transmission data and outputs measurement results to used channel determination section 702. Data amount measuring section 701 measures the amount of data before starting data transmission in order to simplify control. Data is then transmitted using the same used channel until transmission is complete. Data amount measuring section 701 notifies communication terminal apparatus of measurement results before starting transmission.

Used channel determination section 702 then compares measurement results input by data amount measuring section 701 and a threshold value and selects a channel for use. Namely, if the measurement results are greater than or equal to the threshold value, used channel determination section 702 selects a data channel allocated to subcarriers of good reception quality using frequency scheduling and outputs this to coding section 109 as data for transmission data sequence 1. If the measurement results are less than the threshold value, used channel determination section 702 selects a data channel allocated to preassigned subcarriers and outputs this to coding section 110 as data for transmission data sequence 2.

Figure 9:
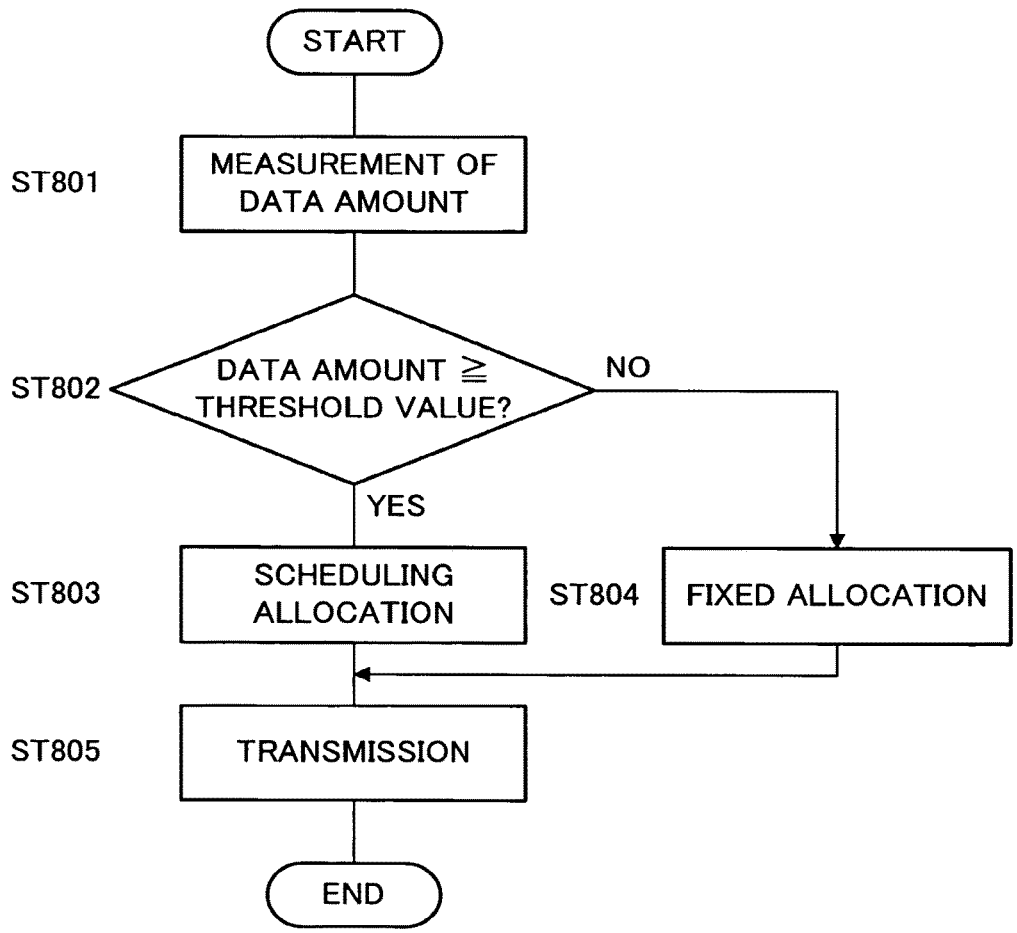
FIG. 9 is a flowchart showing operation of the wireless communication apparatus of the second embodiment of the present invention.

Next, a description is given of the operation of the wireless communication apparatus 700 using FIG. 9. FIG. 9 is a flowchart showing the operation of wireless communication apparatus 700.

First, data amount measuring section 701 measures the amount of data (step ST801).

Next, used channel determination section 702 compares the measured amount of data and a threshold value, and determines whether or not the amount of data is greater than or equal to the threshold value (step ST802).

In the event that the amount of data is greater than or equal to a threshold value, used channel determination section 702 determines allocation of data to subcarriers of superior reception quality (step ST803).

On the other hand, in the event that the amount of data is less than the threshold value, used channel determination section 702 determines allocation of data to preassigned subcarriers (fixed allocation) (step ST804).

Next, wireless communication apparatus 700 transmits data allocated to subcarriers (step ST805). With the exception of data where the amount of data is greater than or equal to a threshold value being allocated to subcarrier blocks and data where the amount of data is less than a threshold value being allocated to preassigned subcarriers, the method of allocating data to each subcarrier is the same as for FIG. 4 and FIG. 5 and is therefore not described.

According to the second embodiment of the invention, in addition to the effects of the first embodiment, it is possible to allocate data for which the amount of data is extremely large to subcarriers of superior quality using frequency scheduling and perform modulation using a modulation scheme with a large M-ary number. It is therefore possible to transmit large amounts of data at high speed and communication terminal apparatus receiving the data can decode the data without error.

Moreover, according to this second embodiment, data for which the amount of data is small is allocated to a plurality of subcarriers decided in advance over the whole of the communication frequency band. It is therefore not necessary to transmit CQI from communication terminal apparatus every subcarrier and the amount of control information can be reduced with respect to the amount of transmission data. It is therefore possible to increase transmission efficiency. Further, communication terminal apparatus receiving data are capable of decoding data without error using the frequency diversity effect.

Third Embodiment

Figure 10:
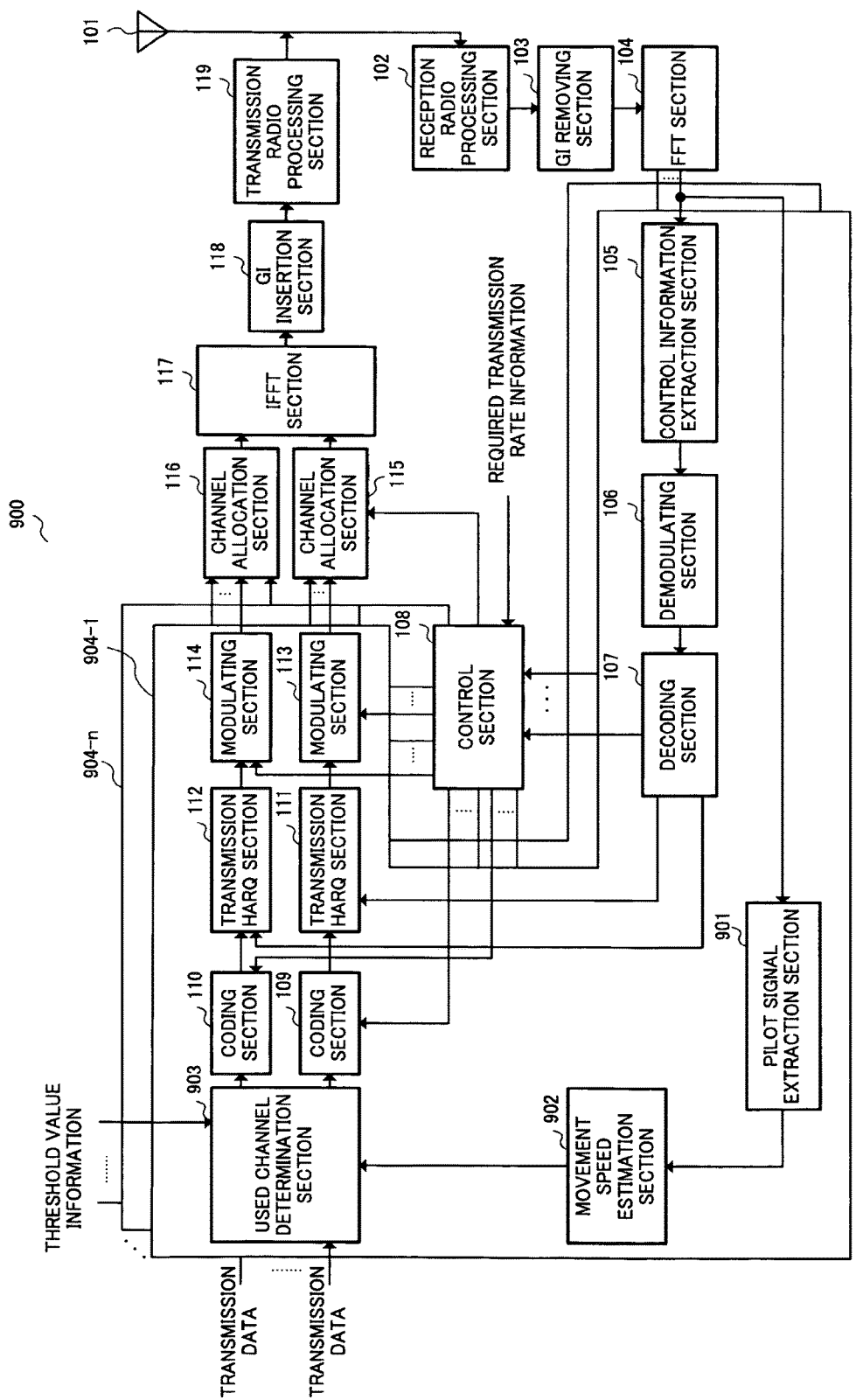
FIG. 10 is a block view showing a configuration for a wireless communication apparatus of a third embodiment of the present invention.

FIG. 10 is a block diagram showing a configuration for a wireless communication apparatus 900 of a third embodiment of the present invention.

As shown in FIG. 10, wireless communication apparatus 900 of this third embodiment is wireless communication apparatus 100 of the first embodiment shown in FIG. 2 with pilot signal extraction section 901, movement speed estimation section 902 and used channel determination section 903 added. In FIG. 10, portions with the same configuration as for FIG. 2 are given the same numerals and are not described.

Transmission data processing sections 904-1 to 904-n are each comprised of control information extraction section 105, demodulating section 106, decoding section 107, coding section 109, coding section 110, transmission HARQ (Hybrid Automatic Repeat Request) section 111, transmission HARQ section 112, modulating section 113, modulating section 114, pilot signal extraction section 901, movement speed estimation section 902, and used channel determination section 903. Transmission data processing sections 904-1 to 904-n are provided for just the number of users and each of the transmission data processing sections 904-1 to 904-n carries out processing on transmission data transmitted to one user.

Pilot signal extraction section 901 extracts a pilot signal from a received signal of communication terminal apparatus inputted by FFT section 104 and outputs this to movement speed estimation section 902.

Movement speed estimation section 902 obtains the amount of fading fluctuation of the pilot signal using the pilot signal inputted by pilot signal extraction section 901 and estimates movement speed of communication terminal apparatus using the obtained amount of fluctuation. Movement speed estimation section 902 then outputs movement speed information for communication terminal apparatus to used channel determination section 903 as estimation results.

Used channel determination section 903 then compares movement speed information input by movement speed estimation section 902 with a threshold value to select a channel for use. Namely, if the estimated speed of movement of a communication partner is less than the threshold value, used channel determination section 903 selects a data channel allocated to subcarriers of good reception quality using frequency scheduling and outputs this to coding section 109 as data for transmission data sequence 1. If the estimated speed of movement of the communication partner is greater than or equal to the threshold value, used channel determination section 903 selects a data channel allocated to preassigned subcarriers and outputs this to coding section 110 as data for transmission data sequence 2.

Figure 11:
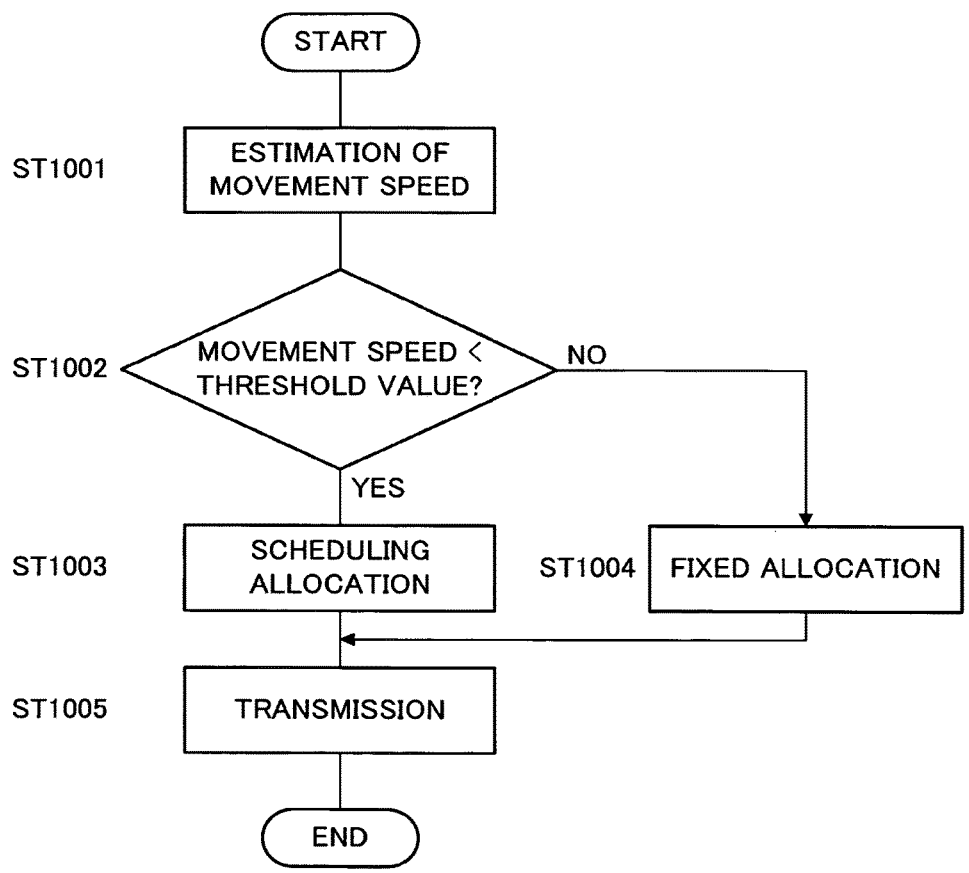
FIG. 11 is a flowchart showing operation of the wireless communication apparatus of the third embodiment of the present invention.

Next, a description is given of the operation of wireless communication apparatus 900 using FIG. 11. FIG. 11 is a flowchart showing the operation of wireless communication apparatus 900.

First, pilot signal extraction section 901 extracts a pilot signal from a received signal and movement speed estimation section 902 estimates movement speed of communication terminal apparatus from the amount of fluctuation of fading of the extracted pilot signal (step ST1001).

Next, used channel determination section 903 compares the estimated movement speed and a threshold value, and determines whether or not the movement speed is less than the threshold value (step ST1002).

In the event that the movement speed is less than the threshold value, control section 108 determines allocation of data to subcarriers of superior reception quality using frequency scheduling (step ST1003). The reason frequency scheduling is used in the case where movement speed is less than the threshold value is that the accuracy of CQI during adaptive allocation of subcarriers at control section 108 is good in cases where speed of fading fluctuation due to movement of the communication terminal apparatus is sufficiently small compared to the period in which CQI reporting is given by communication terminal apparatus and frequency scheduling is therefore effective.

On the other hand, in the event that the movement speed is not less than the threshold value, control section 108 determines allocation of data to preassigned subcarriers (fixed allocation) (step ST1004). The reason why frequency scheduling is not used in the case where movement speed is not less than the threshold value (in cases where the movement speed is greater than or equal to a threshold value) is that the accuracy of CQI during adaptive allocation of subcarriers at control section 108 is poor in cases where speed of fading fluctuation due to movement of the communication terminal apparatus is large compared to the period in which CQI reporting is given by communication terminal apparatus, and deterioration therefore occurs due to frequency scheduling. In this event, more efficient transmission is possible by using channels allocated in a fixed manner such as obtained with frequency diversity, where CQI is not necessary every subcarrier.

Next, wireless communication apparatus 900 transmits data allocated to subcarriers (step ST1005). With the exception of data to be transmitted to communication terminal apparatus of a movement speed of less than a threshold value being allocated to subcarrier blocks and data to be transmitted to communication terminal apparatus of a movement speed in excess of a threshold value being allocated to preassigned subcarriers, the method of allocating data to each subcarrier is the same as for FIG. 4 and FIG. 5 and is therefore not described.

According to the third embodiment of the invention, in addition to the effects of the first embodiment, it is possible to allocate data to be transmitted to communication terminal apparatus of a low movement speed to subcarriers of superior quality using frequency scheduling and perform modulation using a modulation scheme with a large M-ary number. It is therefore possible to transmit data at high speed in an efficient manner and communication terminal apparatus receiving the data can demodulate the data without error.

Further, according to the third embodiment, data transmitted to communication terminal apparatus of a high movement speed is allocated to a plurality of preassigned subcarriers over the whole of the communication frequency band. Thus, communication terminal apparatus receiving the data is capable of demodulating the data without error using the frequency diversity effect.

In the third embodiment, movement speed of communication terminal apparatus is estimated and compared to a threshold value, but this is by no means limiting and fading speed in a time direction may be estimated and compared to a threshold value. Further, it is also possible to report movement speed information from communication terminal apparatus.

Fourth Embodiment

Figure 12:
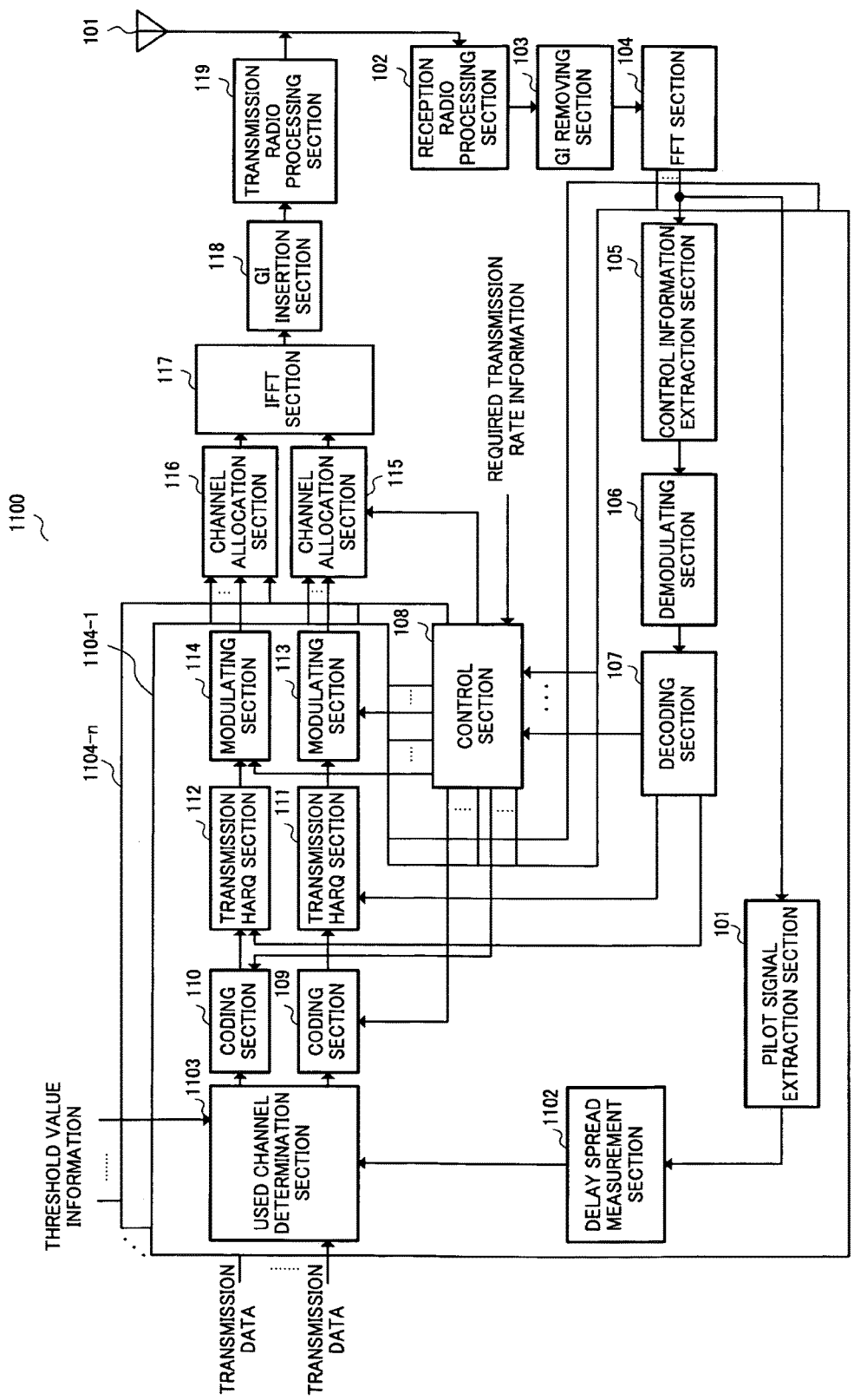
FIG. 12 is a block view showing a configuration for a wireless communication apparatus of a fourth embodiment of the present invention.

FIG. 12 is a block view showing a configuration for a wireless communication apparatus 1100 of a fourth embodiment of the present invention.

As shown in FIG. 12, wireless communication apparatus 1100 of this fourth embodiment is wireless communication apparatus 100 of the first embodiment shown in FIG. 2 with pilot signal extraction section 1101, delay spread measurement section 1102 and used channel determination section 1103 added. In FIG. 12, portions with the same configuration as for FIG. 2 are given the same numerals and are not described.

Transmission data processing sections 1104-1 to 1104-*n* are each comprised of control information extraction section 105, demodulating section 106, decoding section 107, coding section 109, coding section 110, transmission HARQ (Hybrid Automatic Repeat Request) section 111, transmission HARQ section 112, modulating section 113, modulating section 114, pilot signal extraction section 1101, delay spread measurement section 1102, and used channel determination section 1103. Transmission data processing sections 1104-1 to 1104-*n* are provided for just the number of users and each of the transmission data processing sections 1104-1 to 1104-*n* carries out processing on transmission data transmitted to one user.

Pilot signal extraction section 1101 extracts a pilot signal from a received signal of communication terminal apparatus inputted by FFT section 104 and outputs this to delay spread measurement section 1102.

Delay spread measurement section 1102 measures delay spread using a pilot signal inputted by pilot signal extraction section 1101. Delay spread measurement section 1102 outputs results of measuring delay spread to used channel determination section 1103.

Used channel determination section 1103 compares delay spread given by the results of measuring delay spread of a propagation path inputted by delay spread measurement section 1102 with an upper threshold value, and compares delay spread with and a lower threshold value. In the event that delay spread is greater than or equal to the lower threshold value and is less than the upper threshold value, used channel determination section 1103 outputs inputted transmission data to coding section 109 as data of transmission data sequence 1. In the event that delay spread is less than the lower threshold value or is greater than or equal to the upper threshold value, used channel determination section 1103 outputs inputted transmission data to coding section 110 as data of transmission data sequence 2. It is also possible for used channel determination section 1103 to compare delay spread of a propagation path with one threshold value, rather than with an upper threshold value and a lower threshold value. Namely, used channel determination section 1103 may compare delay spread given by results of measuring delay spread of a propagation path inputted by delay spread measurement section 1102 and a threshold value, and may output inputted transmission data to coding section 109 as data for transmission data sequence 1 in the event that delay spread is greater than or equal to a threshold value, and output inputted transmission data to coding section 110 as data for transmission data sequence 2 in the event that delay spread is less than a threshold value.

Figure 13:
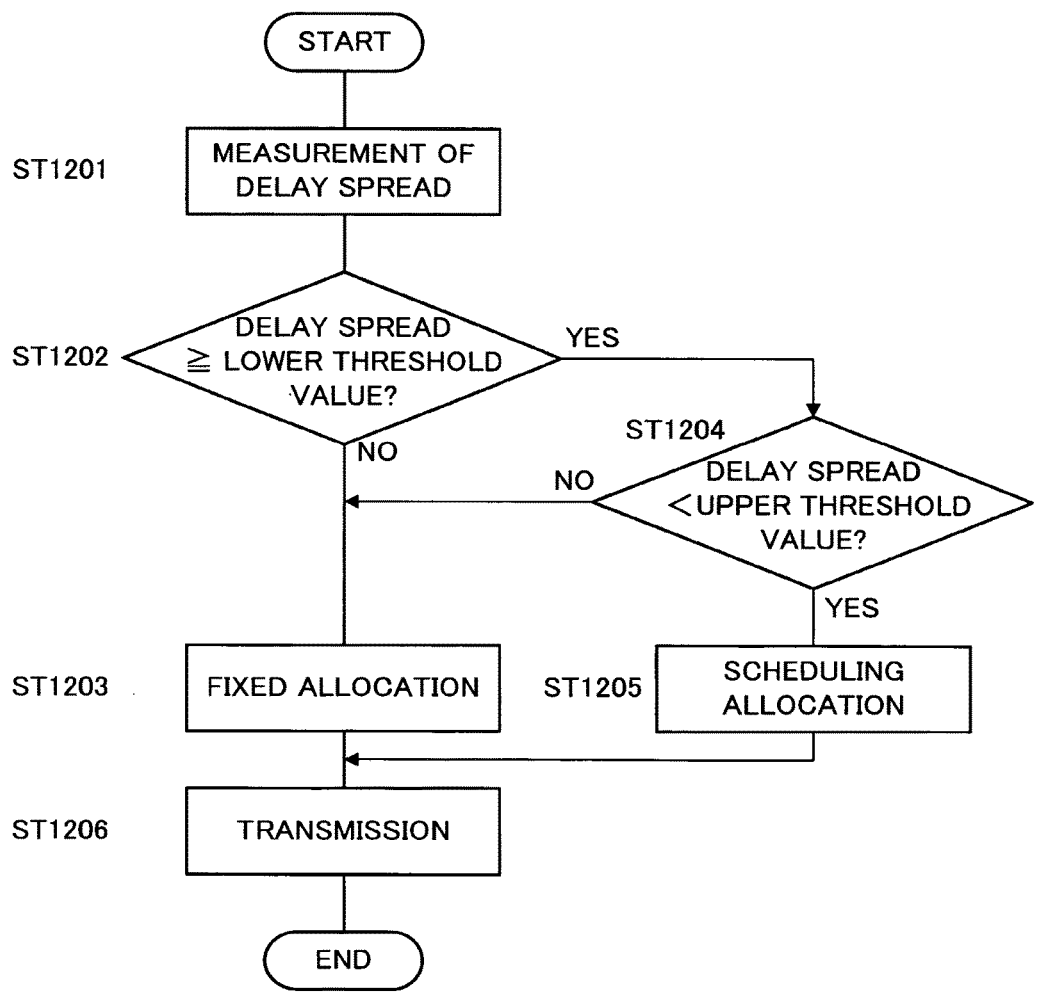
FIG. 13 is a flowchart showing operation of the wireless communication apparatus of the fourth embodiment of the present invention.

Next, a description is given using FIG. 13 of the operation of wireless communication apparatus 1100 in the case of allocating transmission data to subcarriers based on results of comparing delay spread, an upper order threshold value, and a lower order threshold value. FIG. 13 is a flowchart showing the operation of wireless communication apparatus 1100.

First, pilot signal extraction section 1101 extracts a pilot signal using a reception signal and delay spread measurement section 1102 measures delay spread using an extracted pilot signal (step ST1201).

Next, used channel determination section 1103 compares the measured delay spread with a lower threshold value, then determines whether or not delay spread is greater than or equal to a lower threshold value (step ST1202).

In the event that the delay spread is less than the lower threshold value, used channel determination section 1103 outputs transmission data to coding section 110, and control section 108 determines to allocate data to preassigned subcarriers (fixed allocation) (step ST1203).

On the other hand, in the event that delay spread is greater than or equal to the lower threshold value in step ST1202, used channel determination section 1103 determines whether or not the delay spread is less than the upper threshold value (step ST1204).

In the event that the delay spread is less than the upper threshold value, used channel determination section 1103 outputs the transmission data to coding section 110, and control section 108 determines allocation of data to subcarriers of superior reception quality using frequency scheduling (step ST1205).

In the event that delay spread is not less than the upper threshold value in step ST1204, control section 108 determines allocation of data to preassigned subcarriers (fixed allocation) (step ST1203).

Next, wireless communication apparatus 1100 transmits data allocated to subcarriers (step ST1206).

Figure 14:
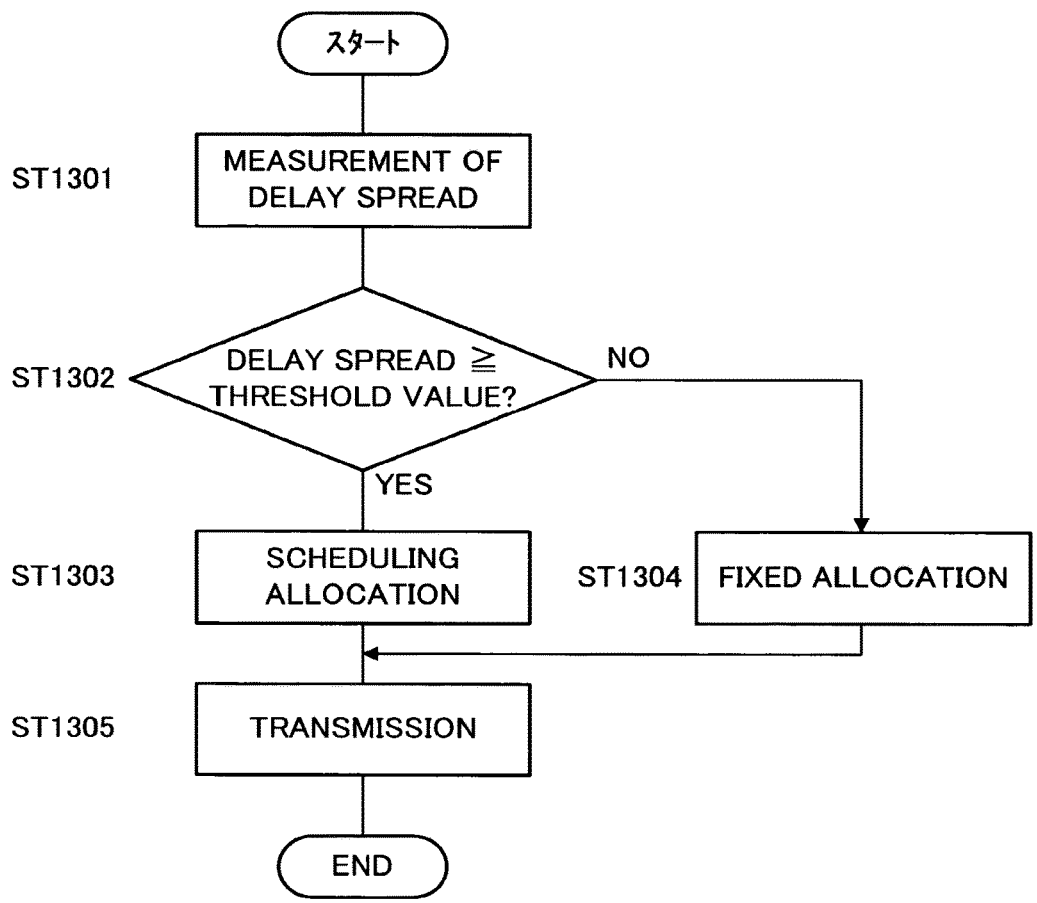
FIG. 14 is a further flowchart showing operation of the wireless communication apparatus of the fourth embodiment of the present invention.

Next, a description is given using FIG. 14 of the operation of wireless communication apparatus 1100 in the case of allocating transmission data to subcarriers based on results of comparing delay spread and a threshold value. FIG. 14 is a flowchart showing the operation of wireless communication apparatus 1100.

First, pilot signal extraction section 1101 extracts a pilot signal using a reception signal and delay spread measurement section 1102 measures delay spread using an extracted pilot signal (step ST1301).

Next, used channel determination section 1103 determines whether or not measured delay spread is greater than or equal to a threshold value (step ST1302).

In the event that the delay spread is greater than or equal to the threshold value, used channel determination section 1103 outputs the transmission data to coding section 109, and control section 108 determines allocation of data to subcarriers of superior reception quality using frequency scheduling (step ST1303).

On the other hand, in the event that the delay spread is not greater than or equal to the threshold value, used channel determination section 1103 outputs transmission data to coding section 110, and control section 108 determines to allocation of data to preassigned subcarriers (fixed allocation) (step ST1304).

Next, wireless communication apparatus 1100 transmits data allocated to subcarriers (step ST1305).

A description is now given of the reason frequency scheduling is not used in the event that propagation path delay spread is less than the threshold value, or in the case that propagation path delay spread is less than a lower threshold value or greater than or equal to an upper threshold value. Regarding a property of a propagation path, in the event that delay spread is small, fluctuations in fading in the frequency direction become smooth, with fluctuations becoming more severe for a large delay spread. In the event that propagation path delay spread is small and fading fluctuation in a frequency direction within subcarrier blocks for transmission data sequence 1 in FIG. 6 and FIG. 7 is small (in the case of smooth fluctuation), from the viewpoint of average reception quality within subcarrier blocks, the difference between superior subcarrier blocks and inferior subcarrier blocks is substantial, and the frequency scheduling effect is large. On the other hand, when propagation path delay spread is too small, there is almost no fading fluctuation in the frequency direction within the whole of the used frequency band and the same reception quality is attained for all subcarrier blocks, with the frequency scheduling effect therefore disappearing. Frequency scheduling is therefore employed when the propagation path delay spread is in the range described above. Further, in the event that the propagation path delay spread is large, fading fluctuation within the subcarrier blocks of FIG. 6A, FIG. 6B, FIG. 7A and FIG. 7B is large, and reception quality is substantially the same for all subcarrier blocks from the viewpoint of average reception quality within subcarrier blocks. In this case, there is almost no frequency scheduling effect, and transmission efficiency falls by giving CQI reporting for every subcarrier. Similarly, when propagation path delay spread is small, there is no frequency scheduling effect because there is no difference in the reception quality of the subcarrier blocks.

With the exception of data where the delay spread is greater than or equal to a threshold value or data where delay spread is greater than or equal to a lower order threshold value and less than an upper order threshold value being allocated to subcarrier blocks and data where the delay spread is less than a threshold value or data where the delay spread is less than a lower order threshold value and greater than or equal to an upper order threshold value being allocated to subcarriers determined in advance, the method of allocating data to each subcarrier is the same as for FIG. 4 and FIG. 5 and is therefore not described.

According to the fourth embodiment, in addition to the effects of the first embodiment, in the event that delay spread is greater than or equal to a threshold value, or in the event that delay spread is greater than or equal to a lower threshold value and less than an upper threshold value, transmission data is allocated to subcarriers of superior quality using scheduling. Therefore, in the event that the difference in reception quality every subcarrier block is large in order to smooth out fluctuations in fading, and the effects of frequency scheduling are therefore large as a result of allocating transmission data to be transmitted to users using a large amount of data being allocated to subcarrier blocks of superior reception quality.

Further, according to the fourth embodiment, in the case of using an upper threshold value and a lower threshold value, scheduling is not carried out in the event that delay spread where the difference between reception quality of each subcarrier blocks is small is less than a lower threshold value. It is therefore possible to make the amount of control information small and increase transmission efficiency as a result of it not being necessary for communication terminal apparatus to transmit CQI.

Fifth Embodiment

Figure 15:
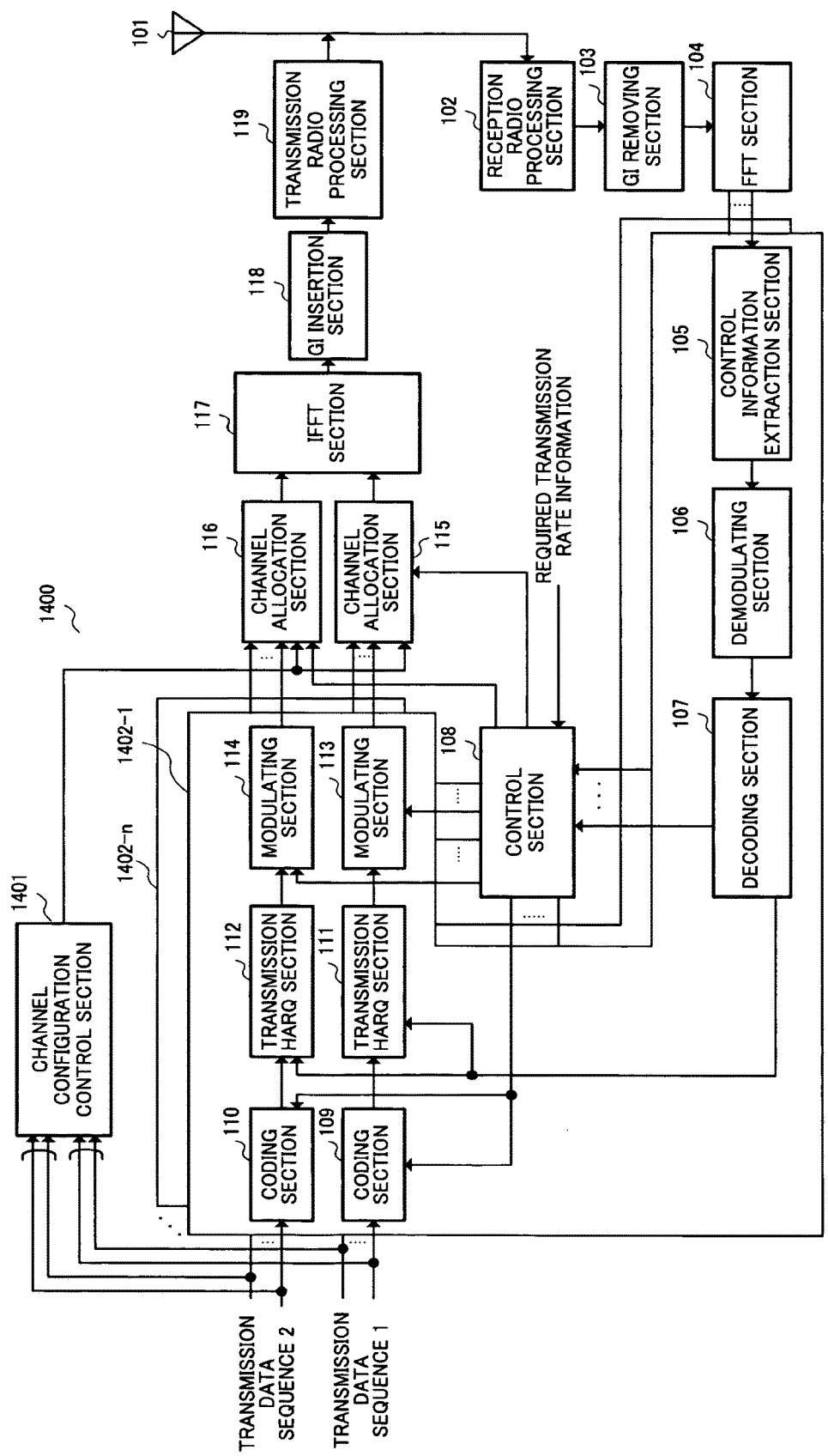
FIG. 15 is a block view showing a configuration for a wireless communication apparatus of a fifth embodiment of the present invention.

FIG. 15 is a block diagram showing a configuration for a wireless communication apparatus 1400 of a fifth embodiment of the present invention.

As shown in FIG. 15, wireless communication apparatus 1400 of this fifth embodiment is wireless communication apparatus 100 of the first embodiment shown in FIG. 2 with channel configuration control section 1401 added. In FIG. 15, portions with the same configuration as for FIG. 2 are given the same numerals and are not described.

Transmission data processing sections 1402-1 to 1402-n are each comprised of control information extraction section 105, demodulating section 106, decoding section 107, coding section 109, coding section 110, transmission HARQ (Hybrid Automatic Repeat Request) section 111, transmission HARQ section 112, modulating section 113 and modulating section 114. Transmission data processing sections 1402-1 to 1402-n are provided for just the number of users and each of the transmission data processing sections 1402-1 to 1402-n carries out processing on transmission data transmitted to one user.

Channel configuration control section 1401 measures the amount of data and required transmission speed for user data transmitted to each communication terminal apparatus and calculates a ratio for the number of low speed data and the number of high speed data (stream number ratio). Channel configuration control section 1401 then sets channel configuration in such a manner that a ratio of high-speed data channels and low-speed data channels is the same as the calculated number ratio and outputs the channel configuration information to channel allocation section 115 and channel allocation section 116.

Channel allocation section 115 allocates transmission data sequence 1 constituted by high-speed data inputted by modulating section 113 to subcarriers for output to IFFT section 117 based on channel configuration information inputted by channel configuration control section 1401 and subcarrier information inputted by control section 108.

Channel allocation section 116 allocates transmission data sequence 2 constituted by low-speed data inputted by modulating section 114 to subcarriers for output to IFFT section 117 based on channel configuration information inputted by channel configuration control section 1401 and subcarrier information inputted by control section 108.

Figure 16:
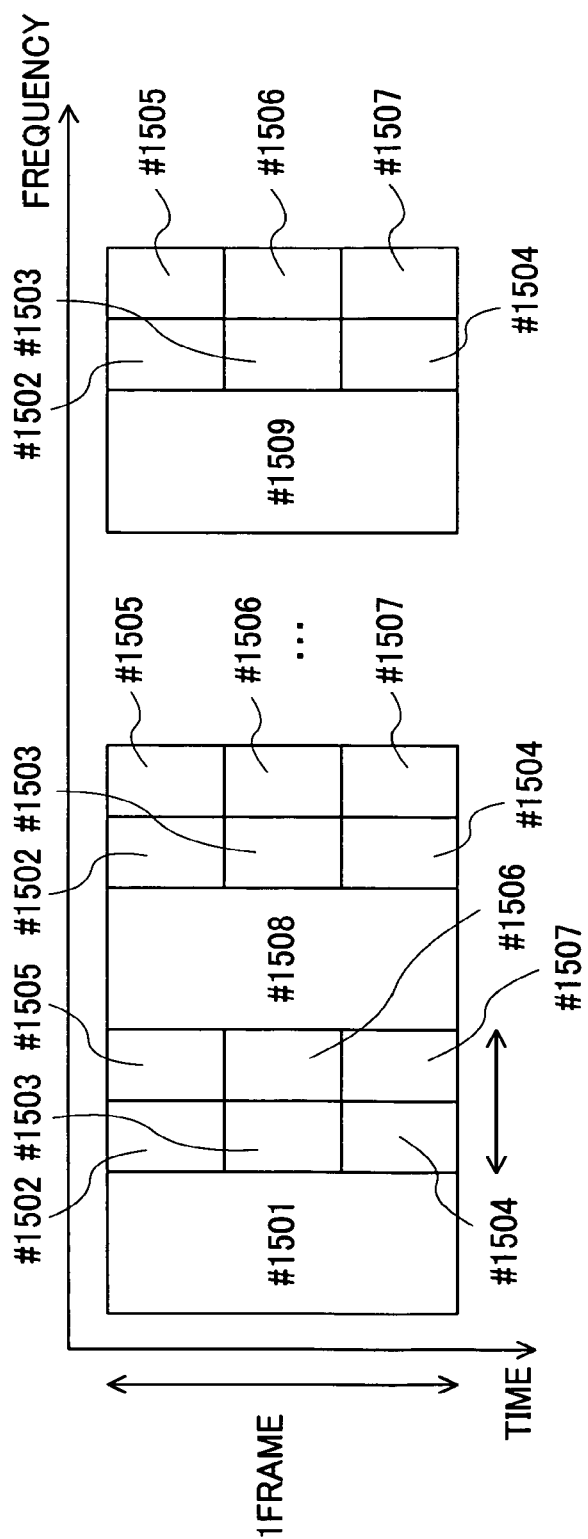
FIG. 16 is view showing allocation of data to subcarriers of the fifth embodiment of the present invention.
Figure 17:
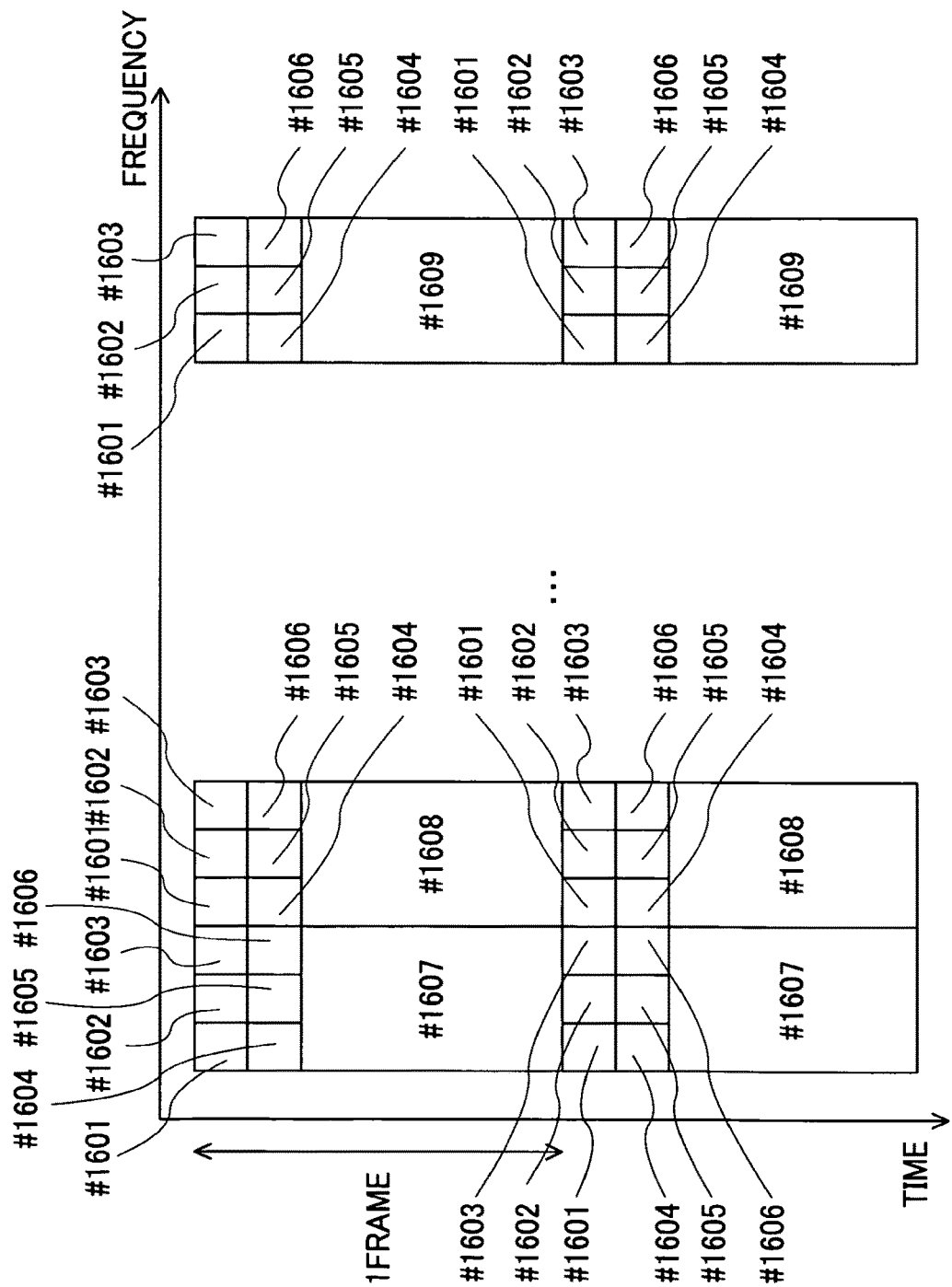
FIG. 17 is another view showing allocation of data to subcarriers of the fifth embodiment of the present invention.

Next, a description is given using FIG. 4, FIG. 5, FIG. 16 and FIG. 17 of a method of allocating subcarriers at wireless communication apparatus 1400. FIG. 16 is a view showing a relationship between frequency and time in the event that transmission data sequence 1 (high-speed data) and transmission data sequence 2 (low speed data) are frequency-multiplexed every frame, and FIG. 17 is a view showing a relationship between frequency and time in the event that transmission data sequence 1 (high-speed data) and transmission data sequence 2 (low-speed data) are time-multiplexed every frame.

First, a description is given of the case where transmission data sequence 1 and transmission data sequence 2 are frequency-multiplexed. FIG. 16 shows the case where the proportion of low-speed data in the number ratio for low-speed data and high-speed data is larger than for FIG. 4, with FIG. 16 showing six low-speed data channels to the three low-speed data channels of FIG. 4.

From FIG. 16 at a predetermined communication frequency band width, data of transmission data sequence 1 transmitted to communication terminal apparatus of user 1 is allocated to subcarrier block #1501, data of transmission data sequence 1 to be transmitted to communication terminal apparatus of user 2 is allocated to subcarrier block #1508, and data of transmission data sequence 1 to be transmitted to communication terminal apparatus of user n is allocated to subcarrier block #1509. On the other hand, data for transmission data sequence 2 transmitted in common to communication terminal apparatus of a plurality of users arbitrarily selected from users 1 to n is allocated to time-multiplexed channels #1502, #1503, #1504, #1505, #1506, #1507, and channels #1502, #1503, #1504, #1505, #1506, #1507 are allocated to subcarriers across each subcarrier block #1501, #1508, #1509. Channels #1502, #1503, #1504, #1505, #1506, #1507 are allocated to a plurality of subcarriers distributed over the whole of the communication frequency band width. As a result, frequency diversity effects are obtained for data for transmission data sequence 2. In this event, the frequency diversity effect is greater for a larger number of allocated subcarriers and a greater spread of subcarrier frequencies.

Next, a description is given of the case where transmission data sequence 1 and transmission data sequence 2 are time-multiplexed. FIG. 17 shows the case where the proportion of low-speed data in the number ratio for low-speed data and high-speed data is larger than for FIG. 5, with FIG. 17 showing six low-speed data channels to the three low-speed data channels of FIG. 5. From FIG. 17 at a predetermined communication frequency band width, data of transmission data sequence 1 transmitted to communication terminal apparatus of user 1 is allocated to subcarrier block #1607, data of transmission data sequence 1 to be transmitted to communication terminal apparatus of user 2 is allocated to subcarrier block #1608, and data of transmission data sequence 1 to be transmitted to communication terminal apparatus of user n is allocated to subcarrier block #1609. On the other hand, data for transmission data sequence 2 transmitted in common to communication terminal apparatus of a plurality of users arbitrarily selected from users 1 to n is allocated to frequency-multiplexed channels #1601, #1602, #1603, #1604, #1605, #1606. Channels #1601, #1602, #1603, #1604, #1605, #1606 are allocated to a plurality of subcarriers distributed over the whole of the communication frequency band width. As a result, frequency diversity effects are obtained for data for transmission data sequence 2. In this event, the frequency diversity effect is greater for a larger number of allocated subcarriers and a greater spread of subcarrier frequencies.

According to the fifth embodiment, in addition to the effects of the first embodiment, the number of high-speed data channels and the number of low-speed data channels are varied according to various amounts of traffic. Thus, transmission efficiency can be further improved.

In this fifth embodiment, the number of low-speed data channels and the number of high-speed data channels is varied according to the amount of low-speed data and the amount of high-speed data but this is by no means limiting, and it is also possible to vary the number of channels every data type according to the amount of data every data type, or vary the number of channels every movement speed according to the amount of data every movement speed for a predetermined range of communication terminal apparatus.

Sixth Embodiment

Figure 18:
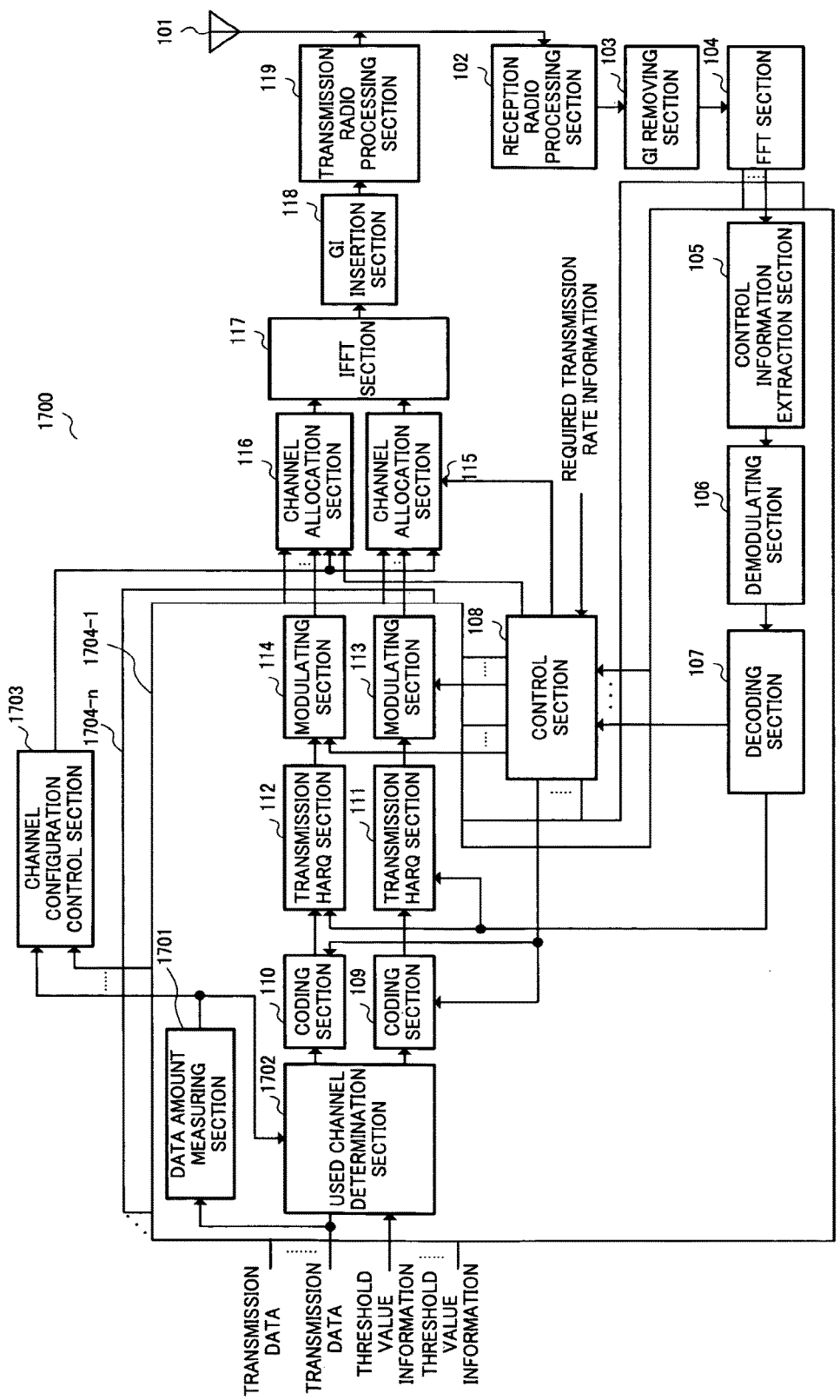
FIG. 18 is a block view showing a configuration for a wireless communication apparatus of a sixth embodiment of the present invention.

FIG. 18 is a block diagram showing a configuration for a wireless communication apparatus 1700 of a sixth embodiment of the present invention.

As shown in FIG. 18, wireless communication apparatus 1700 of this sixth embodiment is wireless communication apparatus 100 of the first embodiment shown in FIG. 2 with data amount measuring section 1701, used channel determination section 1702, and channel configuration control section 1703 added. In FIG. 18, portions with the same configuration as for FIG. 2 are given the same numerals and are not described.

Transmission data processing sections 1704-1 to 1704-n are each constituted by control information extraction section 105, demodulating section 106, decoding section 107, coding section 109, coding section 110, transmission HARQ (Hybrid Automatic Repeat Request) section 111, transmission HARQ section 112, modulating section 113, modulating section 114, data amount measuring section 1701, and used channel determination section 1702. Transmission data processing sections 1704-1 to 1704-n are provided for just the number of users and each of the transmission data processing sections 1704-1 to 1704-n carries out processing on transmission data for transmission to one user.

Data amount measuring section 1701 measures the amount of data for transmission data and outputs measurement results to used channel determination section 1702 and channel configuration control section 1703. Data amount measuring section 1701 measures the amount of data before starting data transmission in order to simplify control. Data is then transmitted using the same channel until transmission is complete. Data amount measuring section 1701 notifies communication terminal apparatus of measurement results before starting transmission.

Used channel determination section 1702 then compares measurement results inputted by data amount measuring section 1701 and a threshold value and selects a channel for use. Used channel determination section 1702 selects a data channel allocated to subcarriers of good reception quality using frequency scheduling and outputs this to coding section 109 as data for transmission data sequence 1. If the measurement results are less than the threshold value, used channel determination section 1702 selects a data channel allocated to preassigned subcarriers and outputs this to coding section 110 as data for transmission data sequence 2.

Channel configuration control section 1703 measures the amount of data and required transmission speed for user data transmitted to each communication terminal apparatus and calculates a ratio for the number of low speed data and the number of high speed data (stream number ratio). Channel configuration control section 1703 then sets channel configuration in such a manner that a ratio of high-speed data channels and low-speed data channels is the same as the calculated number ratio and outputs the channel configuration information to channel allocation section 115 and channel allocation section 116.

Channel allocation section 115 allocates transmission data sequence 1 constituted by high-speed data inputted by modulating section 113 to subcarriers for output to IFFT section 117 based on channel configuration information inputted by channel configuration control section 1703 and subcarrier information inputted by control section 108.

Channel allocation section 116 allocates transmission data sequence 2 constituted by low-speed data inputted by modulating section 114 to subcarriers to output to IFFT section 117 based on channel configuration information inputted by channel configuration control section 1703 and subcarrier information inputted by control section 108.

In the event that data allocated to subcarriers in this manner is frequency-multiplexed, as shown in FIG. 16, high-speed data whose amount is greater than or equal to a threshold value is allocated to channel #1501, #1508, #1509, and low-speed data whose amount is less than a threshold value is allocated to channel #1502, #1503, #1504, #1505, #1506, #1507. Further, low-speed data whose amount is greater than or equal to the threshold value is allocated to channels #1501, #1508, #1509, and high-speed data whose amount is less than the threshold value is allocated to channels #1502, #1503, #1504, #1505, #1506, #1507. This is by no means limiting, and low-speed data whose amount is greater than or equal to the threshold value may also be allocated to channels #1502, #1503, #1504, #1505, #1506, #1507 and high-speed data whose amount is less than the threshold value may be allocated to channels #1501, #1508, #1509.

On the other hand, as shown in FIG. 17, in the case of time-division multiplexing, high-speed data whose amount is greater than or equal to the threshold value is allocated to channels #1607, #1608, #1609, and low-speed data whose amount is less than the threshold value is allocated to channels #1601, #1602, #1603, #1604, #1605, #1606. Further, low-speed data whose amount is greater than or equal to the threshold value is allocated to channels #1607, #1608, #1609, and high-speed data whose amount is less than the threshold value is allocated to channels #1601, #1602, #1603, #1604, #1605, #1606. This is by no means limiting, and low-speed data whose amount is greater than or equal to the threshold value may also be allocated to channels #1601, #1602, #1603, #1604, #1605, #1606 and high-speed data whose amount is less than the threshold value may be allocated to channels #1607, #1608, #1609.

According to the sixth embodiment, in addition to the effects of the first, second and fifth embodiments, in the event that the amount of high-speed data is large but the total amount of high-speed data is smaller than that of the low-speed data, it is possible to improve transmission efficiency of high-speed data by allocating high-speed data to subcarriers of superior reception quality, and transmission efficiency of low-speed data is also improved as a result of increasing the number of channels for low-speed data. The overall transmission efficiency can therefore be improved for wireless communication apparatus by setting an optimum number of channels according to the data amount of low-speed data and high-speed data.

Seventh Embodiment

Figure 19:
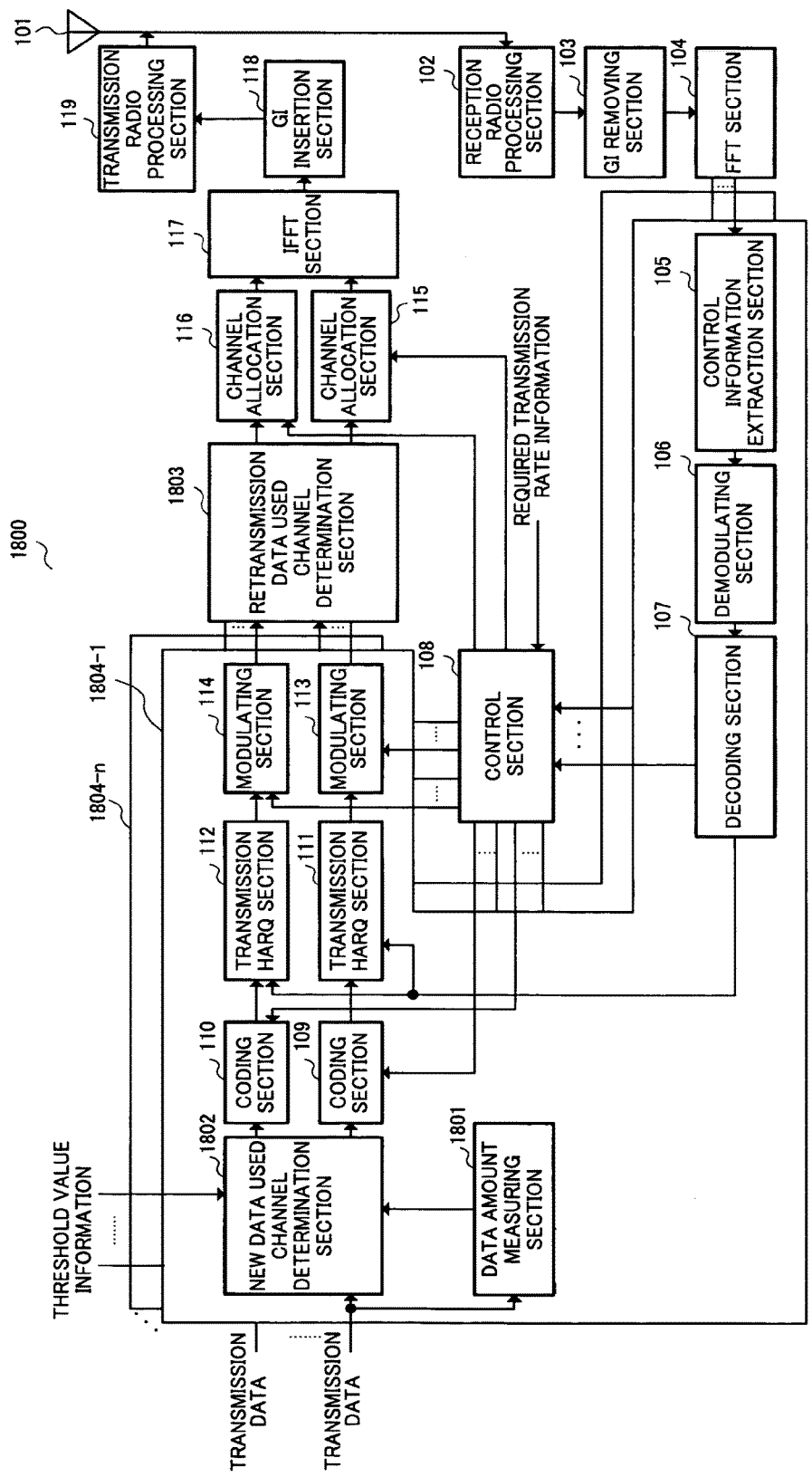
FIG. 19 is a block view showing a configuration for a wireless communication apparatus of a seventh embodiment of the present invention.

FIG. 19 is a block diagram showing a configuration for a wireless communication apparatus 1800 of a seventh embodiment of the present invention.

As shown in FIG. 19, wireless communication apparatus 1800 of this seventh embodiment is wireless communication apparatus 100 of the first embodiment shown in FIG. 2 with data amount measuring section 1801, new data used channel determination section 1802, and retransmission data used channel determination section 1803. In FIG. 19, portions with the same configuration as for FIG. 2 are given the same numerals and are not described.

Control information extraction section 105, demodulating section 106, decoding section 107, coding section 109, coding section 110, transmission HARQ (Hybrid Automatic Repeat Request) section 111, transmission HARQ section 112, modulating section 113, modulating section 114, data amount measuring section 1801, and new data used channel determination section 1802. Transmission data processing sections 1804-1 to 1804-n are provided for just the number of users and each of the transmission data processing sections 1804-1 to 1804-n carries out processing on transmission data transmitted to one user.

Data amount measuring section 1801 measures the amount of data for transmission data and outputs measurement results to new data used channel determination section 1802. Data amount measuring section 1801 measures the amount of data before starting data transmission in order to simplify control. Data is then transmitted using the same channel until transmission is complete. Data amount measuring section 1801 notifies communication terminal apparatus of measurement results before starting transmission.

New data used channel determination section 1802 then compares measurement results inputted by data amount measuring section 1801 and a threshold value and selects a channel for use. Namely, if the measurement results are greater than or equal to the threshold value, new data used channel determination section 1802 selects a data channel allocated to subcarriers of good reception quality using frequency scheduling and outputs this to coding section 109 as data for transmission data sequence 1. If the measurement results are less than the threshold value, new data used channel determination section 1802 selects a data channel allocated to preassigned subcarriers and outputs to coding section 110 as data for transmission data sequence 2.

Retransmission data used channel determination section 1803 determines whether transmission data inputted by modulating section 113 and modulating section 114 is new data or retransmitted data. In the case of new data, the data is sent as is to channel allocation section 115 and channel allocation section 116. In the case of retransmitted data, this data is outputted only to channel allocation section 116 as data for transmission data sequence 2 as a result of allocation to preassigned subcarriers.

Channel allocation section 115 allocates new data inputted by retransmitted data used channel determination section 1803 to subcarriers based on subcarrier information inputted by control section 108 and outputs this to IFFT section 117. Channel allocation section 115 allocates the new data to subcarriers of superior reception quality.

Channel allocation section 116 allocates new data or retransmitted data inputted by retransmitted data used channel determination section 1803 to subcarriers based on subcarrier information inputted by control section 108 and outputs this to IFFT section 117. Channel allocation section 116 allocates the new data or retransmitted data to preassigned subcarriers.

Figure 20:
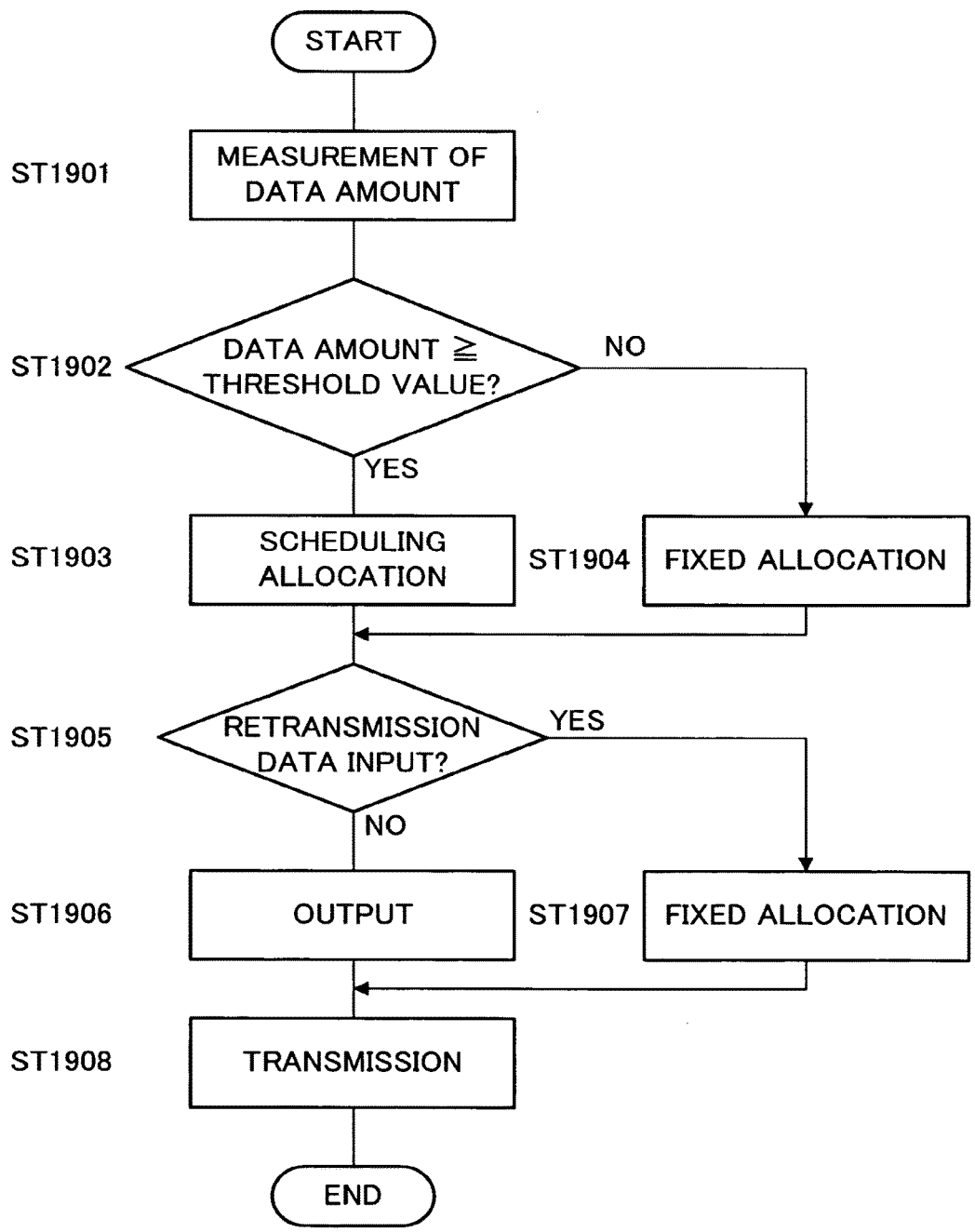
FIG. 20 is a further flowchart showing operation of the wireless communication apparatus of the seventh embodiment of the present invention.

Next, a description is given of the operation of wireless communication apparatus 1800 using FIG. 20. FIG. 20 is a flowchart showing the operation of wireless communication apparatus 1800.

First, data amount measuring section 1801 measures the amount of data (step ST1901).

Next, new data used channel determination section 1802 compares the measured amount of new data and a threshold value and determines whether or not the amount of data for the new data is greater than or equal to the threshold value (step ST1902).

In the event that the amount of new data is greater than or equal to a threshold value, new data used channel determination section 1802 determines allocation of new data to subcarriers of superior reception quality (step ST1903).

On the other hand, in the event that the amount of new data is less than the threshold value, new data used channel determination section 1802 determines allocation of new data to preassigned subcarriers (fixed allocation) (step ST1904).

Next, retransmitted data used channel determination section 1803 determines whether or not input data is retransmitted data (step ST1905).

In the event that retransmitted data is not inputted, retransmitted data used channel determination section 1803 outputs the data as is (step ST1906). As a result, at channel allocation section 115 and channel allocation section 116, the new data is allocated to channels determined at new data used channel determination section 1802.

On the other hand, in the event that retransmitted data is inputted, retransmitted data used channel determination section 1803 determines allocation of the retransmitted data to preassigned subcarriers (fixed allocation) (step ST1907).

Next, wireless communication apparatus 1800 transmits the new data or retransmitted data allocated to subcarriers (step ST1908). With the exception of data where new data for which the amount of data is greater than or equal to a threshold value being allocated to subcarrier blocks and data where the amount of data is less than a threshold value being allocated to subcarriers determined in advance, the method of allocating new data or retransmitted data to each subcarrier is the same as for FIG. 4 and FIG. 5 and is therefore not described.

According to the seventh embodiment, in addition to the effects of the first and second embodiments, retransmitted data is always allocated to preassigned subcarriers and a fixed rate capable of decoding subcarriers retransmitted data is allocated to without errors is applied. It is therefore possible to prevent retransmitted data from being subjected to adaptive modulation using an erroneous modulation scheme thus causing transmission efficiency to deteriorate with repeated retransmissions. Namely, because retransmitted data is transmitted when transmission data for the previous time was incorrect, in the event that retransmission is requested, the case that the transmission did not proceed correctly using frequency scheduling and adaptive modulation as a result of CQI estimation errors, etc., at the time of the previous transmission is to be considered, with there being the possibility that errors may occur at the time of retransmission for the same reasons. The allocation of preassigned subcarriers at the time of retransmission is therefore also effective for this with regards to this in preventing falling of transmission rate due to repeated retransmissions.

According to the seventh embodiment, it is possible to obtain a frequency diversity effect by allocating retransmitted data to preassigned subcarriers spread over the whole of the communication frequency band. It is therefore possible to suppress the effects of fading fluctuation with respect to retransmitted data to a minimum and prevent deterioration of transmission rate due to repeated retransmissions.

In the seventh embodiment, retransmitted data is allocated to preassigned subcarriers but this is by no means limiting, and allocation of retransmitted data with a predetermined number or more retransmission to preassigned subcarriers is also possible.

Eighth Embodiment

In this embodiment, in the configuration for the wireless communication apparatus and wireless terminal apparatus of the first to seventh embodiments, communication terminal apparatus allocated subcarriers by frequency scheduling only generates CQI's for a number of subcarriers designated by an upper layer station apparatus of communication terminal apparatus such as control station apparatus, etc., and reports these to base station apparatus.

According to this embodiment, the amount of control information transmitted by frequency-scheduled communication terminal apparatus can be made extremely small. The transmission rate can then be further improved by making the amount of control information for the whole of the communication terminal apparatus communicating with the base station apparatus small.

In the first to seventh embodiments and other embodiments, just one of either frequency multiplexing or time-dividing multiplexing is used but this is by no means limiting, and a combination of frequency multiplexing and time multiplexing is possible as a multiplexing method for users of a multicarrier transmission method. In this case, in the first embodiment to third embodiment, a time slot for transmitting transmission data sequence 1 that has been subjected to frequency scheduling and a time slot for transmitting transmission data sequence 2 that has not been subjected to frequency scheduling are decided in advance. The wireless communication apparatus then allocates time slots to the transmission data according to properties of the transmission data sequence and the propagation path environment. As a result of doing this, it is merely necessary to change time slot allocation when adaptively changing the respective number of channels and amount of data transmitted by the respective channels, and straightforward control can therefore be achieved. Further, data allocated to subcarriers of superior reception quality as a result of frequency scheduling and data allocated to subcarriers determined in advance is not limited to the data of the first to seventh embodiments and further embodiment, and application is possible to arbitrary data provided frequency scheduling and adaptive modulation results can be obtained.

The wireless communication apparatus of the first to seventh embodiments and other embodiment may also be applied to base station apparatus.

Ninth Embodiment

The wireless communication apparatus of this embodiment is such that a movement speed estimation section for estimating movement speed of a communicating party from a received signal is provided for the configuration of the third embodiment. The subcarrier allocation section then allocates first data transmitted to a communicating party of a movement speed estimated by the movement speed estimation section of greater than or equal to a preassigned threshold value to subcarriers selected by scheduling, second data transmitted to a communicating party of a movement speed estimated by the movement speed estimation section of less than the preassigned threshold value to preassigned subcarriers.

In the subcarrier allocation method of this embodiment, a step of estimating movement speed of a communicating party from a received signal is provided in the method of the third embodiment. First data to be transmitted to a communicating party of an estimated movement speed of greater than or equal to a predetermined threshold value is then allocated to subcarriers selected by scheduling, second data to be transmitted to a communicating party of an estimated movement speed of less than the predetermined threshold value is allocated to preassigned subcarriers. Therefore, according to this embodiment, for example, data transmitted to communication terminal apparatus of a large movement speed is allocated to subcarriers of superior quality by scheduling. This means that deterioration in reception quality due to fading fluctuation can be kept to a minimum. Further, data to be transmitted to communication terminal apparatus of a small movement speed is allocated to a plurality of subcarriers determined in advance. It is therefore possible to make signal processing high-speed because scheduling is not necessary.

Tenth Embodiment

With wireless communication apparatus of this embodiment, in the configuration of the first embodiment, the subcarrier allocation section allocates second data to a plurality of subcarriers at predetermined frequency intervals within the communication frequency band width.

Further, with the subcarrier allocation method of this embodiment, in the first embodiment, second data is allocated to a plurality of subcarriers at predetermined frequency intervals within the communication frequency band width.

According to this embodiment, second data is allocated spread over a plurality of subcarriers spanning the whole of the communication frequency band width. It is therefore possible to demodulate second data without error even in cases where a situation where deterioration of quality due to fading fluctuation, etc., continues for a long time by obtaining frequency diversity effect.

Eleventh Embodiment

With a wireless communication apparatus of this embodiment, in the configuration of the first embodiment, a subcarrier allocation section holds a reference table storing modulation scheme information correlating reception quality information and a modulation scheme. The modulation scheme is then selected for each subcarrier using reception quality information for the communicating party, and first data is allocated to subcarriers using scheduling in such a manner that the required transmission rate for each communicating party is satisfied using required transmission rate information. Further, with the method of allocating subcarriers of the present invention, in the method of the first embodiment, reception quality information for a communicating party is employed, and a modulation scheme is selected for each subcarrier by referring to modulation scheme information associating the reception quality information and the modulation scheme. First data is then allocated to subcarriers by scheduling in such a manner that required transmission rate for each communicating party is satisfied using the required transmission rate information.

Therefore, according to this embodiment, straightforward processing for scheduling can be carried out simply by referring to a reference table and scheduling is performed in such a manner as to satisfy a required transmission rate. It is therefore possible to receive data of superior quality at each communication terminal apparatus.

Each function block employed in the description of each of the aforementioned embodiments may typically be implemented as an LSI constituted by an integrated circuit. These may be individual chips or partially or totally contained on a single chip.

"LSI" is adopted here but this may also be referred to as "IC", "system LSI", "super LSI", or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application in biotechnology is also possible.

This specification is based on Japanese patent application No. 2003-295971, filed on Aug. 20, 2003, the entire content of which is expressly incorporated herein by reference.

INDUSTRIAL APPLICABILITY

The wireless communication apparatus and subcarrier allocation method of the present invention is capable of improving transmission rate by selecting data to be subjected to frequency scheduling according to data type, is effective in achieving high-speed signal processing, and is useful in allocating subcarriers.

The invention claimed is:

1. A communication method implemented by a terminal apparatus, the method comprising:
   receiving, from a base station apparatus, control information indicating whether the terminal apparatus is to transmit one channel quality indicator (CQI) for each subcarrier block within a communication frequency band or one CQI for all subcarrier blocks within the communication frequency band instead of multiple CQIs for multiple subcarrier blocks within the communication frequency band; and
   transmitting one CQI for each subcarrier block within the communication frequency band or one CQI for all subcarrier blocks within the communication frequency band to the base station apparatus according to the received control information.

2. The method of claim 1, wherein the one CQI for all subcarrier blocks within the communication frequency band indicates an average reception quality of all the subcarrier blocks.

3. The method of claim 1, wherein the received control information indicates that the terminal apparatus is to transmit one CQI for each subcarrier block within the communication frequency band in case a movement speed of the terminal apparatus is less than a threshold value, or else indicates that the terminal apparatus is to transmit one CQI for all subcarrier blocks within the communication frequency band.

4. The method of claim 1, wherein the received control information indicates that the terminal apparatus is to transmit one CQI for each subcarrier block within the communication frequency band in case an amount of data transmitted to the terminal apparatus is greater than a threshold value, and else indicates that the terminal apparatus is to transmit one CQI for all subcarrier blocks within the communication frequency band.

5. The method of claim 1, wherein the received control information indicates that the terminal apparatus is to transmit one CQI for each subcarrier block within the communication frequency band in case frequency scheduling is performed, and else indicates that the terminal apparatus is to transmit one CQI for all subcarrier blocks within the communication frequency band.

6. The method of claim 1, wherein the one CQI is based on at least one of carrier to interference ratio (CIR) and signal to interference ratio (SIR).

7. The method of claim 1, wherein the one CQI is based on comparison between a measured reception quality value and a plurality of CQI selection threshold values.

8. The method of claim 1, further comprising receiving, from the base station apparatus, information regarding a modulation and coding scheme (MCS) selected by the base station apparatus for use in a subcarrier block allocated to the terminal apparatus.

9. The method of claim 1, wherein the selected MCS is correlated to the transmitted one CQI.

10. The method of claim 9, wherein the selected MCS is correlated to the transmitted one CQI to satisfy a transmission rate determined for the terminal apparatus.

11. A terminal apparatus comprising:
a receiver which, in operation, receives, from a base station apparatus, control information indicating whether the terminal apparatus is to transmit one channel quality indicator (CQI) for each subcarrier block within a communication frequency band or one CQI for all subcarrier blocks within the communication frequency band instead of multiple CQIs for multiple subcarrier blocks within the communication frequency band; and
a transmitter, coupled to the receiver, which, in operation, transmits one CQI for each subcarrier block within the communication frequency band or one CQI for all subcarrier blocks within the communication frequency band to the base station apparatus according to the received control information.

12. The terminal apparatus of claim 11, wherein the one CQI for all subcarrier blocks within the communication frequency band indicates an average reception quality of all the subcarrier blocks.

13. The terminal apparatus of claim 11, wherein the received control information indicates that the terminal apparatus is to transmit one CQI for each subcarrier block within the communication frequency band in case a movement speed of the terminal apparatus is less than a threshold value, or else indicates that the terminal apparatus is to transmit one CQI for all subcarrier blocks within the communication frequency band.

14. The terminal apparatus of claim 11, wherein the received control information indicates that the terminal apparatus is to transmit one CQI for each subcarrier block within the communication frequency band in case an amount of data transmitted to the terminal apparatus is greater than a threshold value, and else indicates that the terminal apparatus is to transmit one CQI for all subcarrier blocks within the communication frequency band.

15. The terminal apparatus of claim 11, wherein the received control information indicates that the terminal apparatus is to transmit one CQI for each subcarrier block within the communication frequency band in case frequency scheduling is performed, and else indicates that the terminal apparatus is to transmit one CQI for all subcarrier blocks within the communication frequency band.

16. The terminal apparatus of claim 11, wherein the one CQI is based on at least one of carrier to interference ratio (CIR) and signal to interference ratio (SIR).

17. The terminal apparatus of claim 11, wherein the one CQI is based on comparison between a measured reception quality value and a plurality of CQI selection threshold values.

18. The terminal apparatus of claim 11, wherein the receiver, in operation, further receives, from the base station apparatus, information regarding a modulation and coding scheme (MCS) selected by the base station apparatus for use in a subcarrier block allocated to the terminal apparatus.

19. The terminal apparatus of claim 11, wherein the selected MCS is correlated to the transmitted one CQI.

20. The terminal apparatus of claim 19, wherein the selected MCS is correlated to the transmitted one CQI to satisfy a transmission rate determined for the terminal apparatus.

* * * * *